(12) United States Patent
Chen et al.

(10) Patent No.: US 12,108,161 B2
(45) Date of Patent: Oct. 1, 2024

(54) PHOTOGRAPHING APPARATUS AND METHOD

(71) Applicant: HUAWEI TECHNOLOGIES CO., LTD., Guangdong (CN)

(72) Inventors: Xiaolei Chen, Hangzhou (CN); Jinxin Huang, Hangzhou (CN); Changcai Lai, Shenzhen (CN); Hongqi Hu, Hangzhou (CN); Changjiu Yang, Hangzhou (CN); Shisheng Zheng, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 98 days.

(21) Appl. No.: 17/965,083

(22) Filed: Oct. 13, 2022

(65) Prior Publication Data

US 2023/0032520 A1 Feb. 2, 2023

Related U.S. Application Data

(63) Continuation of application No. PCT/CN2021/087011, filed on Apr. 13, 2021.

(30) Foreign Application Priority Data

Apr. 14, 2020 (CN) .......................... 202010291888.4

(51) Int. Cl.
*H04N 5/265* (2006.01)
*H04N 9/64* (2023.01)
*H04N 23/72* (2023.01)

(52) U.S. Cl.
CPC ............. *H04N 23/72* (2023.01); *H04N 5/265* (2013.01); *H04N 9/646* (2013.01)

(58) Field of Classification Search
CPC ........ H04N 23/72; H04N 5/265; H04N 9/646; H04N 23/125; H04N 23/61; H04N 23/74; H04N 23/55; H04N 23/75; H04N 23/70
(Continued)

(56) References Cited

U.S. PATENT DOCUMENTS 5,001,556 A 3/1991 Nakamura et al.
11,624,704 B2 * 4/2023 Swenson .................... G01J 3/42
250/339.13

(Continued)

FOREIGN PATENT DOCUMENTS

CN 102075683 A 5/2011
CN 104408749 A 3/2015
(Continued)

*Primary Examiner* — Tung T Vo
(74) *Attorney, Agent, or Firm* — WOMBLE BOND DICKINSON (US) LLP

(57) ABSTRACT

This application discloses a photographing apparatus and method, and relates to the field of image processing. When a high-quality image in a low illumination environment is obtained, costs are reduced, a size is reduced, and product compatibility is improved. The method includes: controlling a light filtering unit to: transparently transmit visible light in incident light and block infrared light in the incident light in a first image exposure interval, transparently transmit the infrared light in the incident light in a first time period of a second image exposure interval, and block the incident light in a second time period of the second image exposure interval; performing, by using an image sensor to obtain a first image, and performing photoelectric imaging on a light ray to obtain a second image; and synthesizing the first image and the second image, to generate a first target image.

20 Claims, 19 Drawing Sheets

Infrared light compensation apparatus 202

Visible light compensation apparatus 203

Photographing apparatus 201

(58) Field of Classification Search
USPC .......................................................... 348/164
See application file for complete search history.

(56) References Cited

U.S. PATENT DOCUMENTS

| | | | |
|---|---|---|---|
| 2007/0008455 A1* | 1/2007 | Svec ..................... | H04N 23/55 |
| | | | 348/E5.04 |
| 2011/0169984 A1* | 7/2011 | Noguchi ................ | H04N 23/11 |
| | | | 348/E9.053 |
| 2014/0132775 A1* | 5/2014 | Fischer .................. | H04N 23/11 |
| | | | 348/164 |
| 2021/0223446 A1* | 7/2021 | Yamada ................ | G02B 5/3025 |
| 2022/0222795 A1* | 7/2022 | Fan ........................ | H04N 5/265 |
| 2022/0247980 A1* | 8/2022 | Fan ........................ | H04N 23/56 |

FOREIGN PATENT DOCUMENTS

| | | | |
|---|---|---|---|
| CN | 104661008 A | 5/2015 | |
| CN | 106101530 A | 11/2016 | |
| CN | 209419708 U | 9/2019 | |
| CN | 110381244 A | 10/2019 | |
| CN | 110490187 A | 11/2019 | |
| CN | 110493492 A | 11/2019 | |
| CN | 110493537 A | 11/2019 | |
| CN | 110519489 A | 11/2019 | |
| CN | 110634420 A | 12/2019 | |
| CN | 210093336 U | 2/2020 | |
| JP | 2003032657 A | 1/2003 | |
| WO | 2018048231 A1 | 3/2018 | |

\* cited by examiner

Infrared light compensation apparatus 202

Visible light compensation apparatus 203

Photographing apparatus 201

First image

Second image

First target image

First image

Second image

First target image

PHOTOGRAPHING APPARATUS AND METHOD

CROSS-REFERENCE TO RELATED APPLICATIONS

This application is a continuation of International Application No. PCT/CN2021/087011, filed on Apr. 13, 2021, which claims priority to Chinese Patent Application No. 202010291888.4, filed on Apr. 14, 2020. The disclosures of the aforementioned applications are hereby incorporated by reference in their entireties.

TECHNICAL FIELD

Embodiments of this application relate to the image processing field, and in particular, to a photographing apparatus and method.

BACKGROUND

With the rapid development of image applications, people have increasingly high requirements on imaging quality. However, in a low illumination environment, an amount of light entering an imaging sensor decreases, and a signal-to-noise ratio of an output signal of the imaging sensor decreases. As a result, image brightness decreases and noise increases, and imaging quality deteriorates. Therefore, increasing the amount of light entering the image sensor in the low illumination environment is the key to improving quality of low illumination images.

In a traffic snapshot camera, because a camera needs to capture vehicles moving at a high speed, if exposure time is increased to increase an amount of light entering the camera, smearing occurs. Therefore, a light compensation device can be used to perform light compensation, including visible light compensation and infrared light compensation. Visible light compensation can easily obtain real color information of an object, but it may cause visual interference to drivers and pose security risks. Infrared light compensation has no obvious interference to people, but cannot obtain the real color information of the object.

To obtain a high-quality image in a low illumination environment, a spectral image fusion technology is used in the industry to separately shoot a visible light image and an infrared image in a scene, and fuse the two shot images to obtain a high-quality image. This retains real color information of an object as much as possible and avoids visual interference.

Currently, to obtain a visible light image and an infrared image under natural light in a scene, a light ray at a specified wavelength is usually reflected and transmitted by using a light-splitting prism. After passing through the light-splitting prism, the light ray is divided into visible light and infrared light. Image sensors are placed on emergent surfaces of the two types of light for imaging. However, materials of the light-splitting prism and the two image sensors are costly and large. This is not conducive to device miniaturization and product compatibility.

Therefore, when a high-quality image in the low illumination environment is obtained, how to reduce costs, reduce a size, and improve product compatibility becomes an urgent problem to be resolved.

SUMMARY

This application provides a photographing apparatus and method, to reduce costs, reduce a size, and improve product compatibility when a high-quality image in a low illumination environment is obtained.

To achieve the foregoing objective, this application uses the following technical solutions.

According to a first aspect, a photographing apparatus is provided. The apparatus may include a control unit, a light filtering unit, an image sensor, and a synthesis processing unit. The control unit is connected to the light filtering unit, and is configured to control the light filtering unit to: transparently transmit visible light in incident light and block infrared light in the incident light in a first image exposure interval, transparently transmit the infrared light in the incident light in a first time period of a second image exposure interval, and block the incident light in a second time period of the second image exposure interval. The first time period is before the second time period. The control unit is further connected to the image sensor, and is configured to control the image sensor to: perform photoelectric imaging on a light ray that is in the incident light and that passes through the light filtering unit in the first image exposure interval, to obtain a first image, and perform photoelectric imaging on a light ray that is in the incident light and that passes through the light filtering unit in the second image exposure interval, to obtain a second image. The synthesis processing unit is configured to synthesize the first image and the second image, to generate a first target image.

In another alternative embodiment, the control unit may also be configured to control the light filtering unit to: transparently transmit the infrared light in the incident light in the first image exposure interval, transparently transmit the visible light in the incident light and block the infrared light in the incident light in the first time period of the second image exposure interval, and block the incident light in the second time period of the second image exposure interval. Correspondingly, in this alternative embodiment, the first image is a grayscale image, and the second image is a color image.

According to the photographing apparatus provided in this application, different types of incident light are imaged in different image exposure intervals in a time division manner without a light-splitting prism, and only an image sensor is required. This greatly reduces a size of a product and reduces material costs. When the size of the product is reduced, compatibility of the product is improved accordingly.

Further, in this application, if an exposure end moment in a sampling period of the image sensor is fixed, the light filtering unit further blocks the incident light in the second time period of the second image exposure interval. When an exposure end moment of the second image is advanced from an end of the second image exposure interval to an end of the first time period, an exposure end time interval between the second image and the first image is reduced. Therefore, a picture motion error between the first image and the second image can be reduced in a high-speed motion scenario, and a correlation between the two images used for synthesis can be improved, to improve accuracy of image synthesis.

In an embodiment, the light filtering unit may be of a sheet structure, and the light filtering unit may include a first light filter, a second light filter, and a third light filter. The first light filter may be configured to transparently transmit the visible light and block the infrared light, the second light filter is configured to transparently transmit the infrared light, and the third light filter is configured to block the incident light. Correspondingly, the control unit may be configured to control the light filtering unit to rotate, so that the first light filter is configured to filter the incident light in the first image exposure interval, the second light filter is configured to filter the incident light in the first time period, and the third light filter is configured to filter the incident light in the second time period. A function of the light filtering unit is implemented by using the light filter.

In another embodiment, the control unit may also be configured to control the light filtering unit to rotate, so that the second light filter is configured to filter the incident light in the first image exposure interval, the first light filter is used to filter the incident light in the first time period, and the third light filter is used to filter the incident light in the second time period. Correspondingly, in this embodiment, the first image is a grayscale image, and the second image is a color image.

In an embodiment, a shape of the light filtering unit is a circle, a sector, a ring, or a sector ring. A shape of the first light filter, the second light filter, or the third light filter is a circle or a sector ring. The control unit may include a motor. The motor is configured to control the light filtering unit to rotate around a circle center corresponding to the light filtering unit, so that the first light filter directly faces a light sensing area of the image sensor in the first image exposure interval, the second light filter directly faces the light sensing area in the first time period, and the third light filter directly faces the light sensing area of the image sensor in the second time period. By performing circular motion on the light filter in the light filtering unit, different light filters are used to face the image sensor in the time division manner.

In an embodiment, a sum of a center angle corresponding to the second light filter and a center angle corresponding to the third light filter is $\pi$. The light filtering unit rotates for one cycle to obtain one first image and one second image.

In an embodiment, a rotational angular velocity of the light filtering unit is $\omega$. A value of $\omega$ is equal to a product of a frame rate of the apparatus and $2\pi$. A center angle corresponding to the first light filter is $\theta=\omega*t_0+\beta$. The center angle corresponding to the second light filter is $\alpha=\omega*t_1+\beta$. $\beta$ is a minimum center angle corresponding to a light sensing area that is in the light filtering unit and that completely covers the image sensor. $t_0$ is duration of the first image exposure interval. $t_1$ is duration of the first time period.

In an embodiment, the light filtering unit may further include a position sensor, configured to feed back position information to the control unit. The position information indicates a relative position between a light filter and the image sensor in the light filtering unit, or the position information indicates a relative position between a preset mark point and the image sensor in the light filtering unit. Correspondingly, the control unit may be configured to control, based on the position information, the image sensor to start or end the first image exposure interval or the second image exposure interval.

In an embodiment, the first image exposure interval and the second image exposure interval are in a same sampling period, and the frame rate of the apparatus is a quantity of sampling periods within each second.

In an embodiment, the first image exposure interval is before the second image exposure interval.

In an embodiment, the synthesis processing unit may include a processing unit and a synthesis unit. The processing unit may be configured to: correct, based on effective exposure time information of any pixel in the image sensor in the second image exposure interval, a pixel value corresponding to the any pixel in the second image, to obtain a corrected second image. Correspondingly, the synthesis unit may be configured to synthesize the first image and the corrected second image to generate the first target image. Image imbalance caused by transition state (a process from a time when the light sensing area of the image sensor moves out of the second light filter and enters the third light filter to a time when the light sensing area of the image sensor is completely covered by the third light filter) is compensated by correction.

The effective exposure time information may indicate effective exposure duration of any pixel in the image sensor in the second image exposure interval.

In the second image exposure interval, exposure duration of any pixel in the image sensor is duration of the second image exposure interval. However, because the third filter in the light filtering unit blocks the incident light, in the second time period of the second image exposure interval, a pixel in the image sensor first receives the incident light that passes through the second light filter. After a relative position of the pixel in the light filtering unit (the position of the light filtering unit through which the incident light received by the pixel passes) is in the third light filter, the pixel cannot receive the incident light. Therefore, the pixel can receive the incident light in a part of the second time period of the second image exposure interval, and cannot receive the incident light in another time period. For the pixel, even if the pixel is in the exposure interval, exposure is invalid when no incident light is received, exposure duration in which the incident light can be received by the pixel in the second time period of the second image exposure interval may be defined as effective exposure duration of the pixel in the second time period. It should be understood that the effective exposure duration of the pixel in the second period depends on a location of the pixel in the image sensor.

In an embodiment an embodiment, effective exposure time information of any pixel in the image sensor may include effective exposure duration of the any pixel in the second period.

In another embodiment embodiment, the effective exposure time information of the any pixel in the image sensor may include the duration of the first time period and the effective exposure duration of the any pixel in the second time period.

In an embodiment, the effective exposure time information of the any pixel is obtained based on a location of the any pixel in the image sensor.

In an embodiment, the location of the any pixel in the image sensor may include coordinates (x, y) of the any pixel in the light sensing area of the image sensor. The effective exposure time information of the any pixel may include effective exposure duration T of the second time period. T meets the following expression:

$$T = \frac{\frac{\beta}{2} - \arctan\left(\frac{\frac{b}{2} - x}{y + \frac{b}{2\tan\frac{\beta}{2}}}\right)}{\omega}.$$

tan is a tangent operation. arctan is an arctangent operation. b is a side length of one side of the image sensor. $\omega$ is the rotational angular velocity of the light filtering unit. $\beta$ is the minimum center angle corresponding to the light sensing area that is in the light filtering unit and that completely covers the image sensor.

The location of the any pixel in the image sensor may include coordinates (x, y) of the any pixel in the light sensing area of the image sensor. Origin coordinates corresponding to a coordinate system in which the coordinates are located may be a pixel location that first faces the third light filter in the light sensing area of the image sensor.

In an embodiment, the effective exposure time information of the any pixel may include the duration $T_1$ of the first time period and the effective exposure duration T of the second time period. The pixel value pixel1 corresponding to the any pixel in the second image and a pixel value pixel0 corresponding to the any pixel in the corrected second image meet the following relationship:

$$pixel0 = pixel1 / \left(1 + \frac{T}{T_1}\right).$$

A correction coefficient 1+T/T1 of each pixel in the image sensor may constitute a positive matrix of the second image, and the second image is divided by a correction matrix to obtain the corrected second image.

In an embodiment, the first image may be a color image, the second image may be a grayscale image, and the first target image may be a color image.

In an embodiment, the synthesis processing unit is further configured to: register the first image and the second image based on an optical flow between the first image and the second image, and synthesize a registered image in the first image and the second image with another image in the first image and the second image to generate the first target image. The optical flow between the first image and the second image is obtained based on an optical flow between the first image and the third image. The first image and the second image are images obtained in a current sampling period. The third image is a color image obtained in a next sampling period of the current sampling period.

In an embodiment, the control unit may be specifically configured to: when it is determined that a gain of the image sensor is greater than a preset value, control the light filtering unit to transparently transmit the visible light in the incident light and block the infrared light in the incident light in the first image exposure interval, transparently transmit the infrared light in the incident light in the first time period of the second image exposure interval, and block the incident light in the second time period of the second image exposure interval. The first time period is before the second time period. The control unit may be specifically configured to: when it is determined that the gain of the image sensor is greater than the preset value, control the image sensor to: perform photoelectric imaging on the light ray that is in the incident light and that passes through the light filtering unit in the first image exposure interval, to obtain the first image, and perform photoelectric imaging on the light ray that is in the incident light and that passes through the light filtering unit in the second image exposure interval, to obtain the second image. A high-quality image is obtained by using the solution in this application in a case of a scene of a low illumination environment.

In an embodiment, the control unit may be further configured to: when it is determined that the gain of the image sensor is less than or equal to the preset value, control the light filtering unit to transparently transmit polarized light that is in the incident light and has a preset vibration direction and block light whose vibration direction is different from the preset vibration direction, and control the image sensor to perform photoelectric presentation on the polarized light that has the preset vibration direction, to obtain a second target image.

In an embodiment, the apparatus may further include an infrared light compensation unit. The infrared light compensation unit is connected to the control unit. The control unit is further configured to control, when the second image exposure interval starts, the infrared light compensation unit to generate the infrared light.

In an embodiment, the synthesis processing unit may include the processing unit and the synthesis unit. The processing unit may be configured to determine whether there is a target object in the first image. The synthesis unit is configured to: when there is the target object in the first image, synthesize the first image and the second image, to generate the first target image. The synthesis unit is further configured to: when there is no target object in the first image, use the first image as the first target image for outputting. This implements image synthesis when there is a target object in a scene, thereby improving processing efficiency of the apparatus.

In an embodiment, the control unit may further be connected to the synthesis processing unit, and is configured to control a synthesis operation of the synthesis processing unit.

In an embodiment, the control unit may be configured to indicate, to the synthesis processing unit, that an image obtained by the image sensor is the first image or the second image.

In an embodiment, the apparatus may further include a lens, configured to converge incident light.

In an embodiment, the image sensor may be a global shutter sensor.

According to a second aspect, a photographing method is provided, where the method may be applied to a photographing apparatus. The method may include: controlling a light filtering unit to: transparently transmit visible light in incident light and block infrared light in the incident light in a first image exposure interval, transparently transmit the infrared light in the incident light in a first time period of a second image exposure interval, and block the incident light in a second time period of the second image exposure interval, where the first time period is before the second time period; performing, by using an image sensor, photoelectric imaging on a light ray that is in the incident light and that passes through the light filtering unit in the first image exposure interval, to obtain a first image, and performing photoelectric imaging on a light ray that is in the incident light and that passes through the light filtering unit in the second image exposure interval, to obtain a second image; and synthesizing the first image and the second image, to generate a first target image.

According to an embodiment of the photographing method provided in this application, the light filtering unit blocks the incident light in the second time period of the second image exposure interval. When the image sensor continuously reads data for two times at a fixed time, a time interval between the second image and the first image is reduced. Therefore, a picture motion error between the first image and the second image can be reduced in a high-speed motion scenario, and accuracy of a synthesized high-quality image is improved.

In an embodiment, the light filtering unit may be of a sheet structure, and the light filtering unit may include a first light filter, a second light filter, and a third light filter. The first light filter may be configured to transparently transmit the visible light and block the infrared light, the second light filter is configured to transparently transmit the infrared light, and the third light filter is configured to block the incident light. The controlling the light filtering unit to:

transparently transmit visible light in incident light and block infrared light in the incident light in a first image exposure interval, transparently transmit the infrared light in the incident light in a first time period of a second image exposure interval, and block the incident light in a second time period of the second image exposure interval specifically includes: controlling the light filtering unit to rotate, so that the first light filter is configured to filter the incident light in the first image exposure interval, the second light filter is configured to filter the incident light in the first time period, and the third light filter is configured to filter the incident light in the second time period.

In an embodiment, a shape of the light filtering unit is a circle, a sector, a ring, or a sector ring. A shape of the first light filter, the second light filter, or the third light filter is a circle or a sector ring. The controlling the light filtering unit to rotate, so that the first light filter is configured to filter the incident light in the first image exposure interval, the second light filter is configured to filter the incident light in the first time period, and the third light filter is configured to filter the incident light in the second time period includes: controlling the light filtering unit to rotate around a circle center corresponding to the light filtering unit, so that the first light filter directly faces a light sensing area of the image sensor in the first image exposure interval, the second light filter directly faces the light sensing area in the first time period, and the third light filter directly faces the light sensing area in the second time period. By performing circular motion on the light filter in the light filtering unit, different light filters are used to face the image sensor in the time division manner.

In an embodiment, a sum of a center angle corresponding to the second light filter and a center angle corresponding to the third light filter is $\pi$.

In an embodiment, a rotational angular velocity of the light filtering unit is $\omega$. A value of $\omega$ is equal to a product of a frame rate of the apparatus and $2\pi$. A center angle corresponding to the first light filter is $\theta=\omega*t_0+\beta$. The center angle corresponding to the second light filter is $\alpha=\omega*t_1+\beta$. $\beta$ is a minimum center angle corresponding to a light sensing area that is in the light filtering unit and that completely covers the image sensor. $t_0$ is duration of the first image exposure interval. $t_1$ is duration of the first time period.

In an embodiment, the photographing method provided in this application may further include: obtaining position information by using a position sensor, where the position information may indicate a relative position between a light filter and the image sensor in the light filtering unit, or the position information may indicate a relative position between a preset mark point and the image sensor in the light filtering unit; and controlling, based on the position information, the image sensor to start or end the first image exposure interval or the second image exposure interval.

In an embodiment, the first image exposure interval and the second image exposure interval are in a same sampling period, and a quantity of sampling periods within each second is a frame rate corresponding to the first target image.

In an embodiment, the first image exposure interval is before the second image exposure interval.

In an embodiment, the synthesizing the first image and the second image, to generate a first target image includes: correcting, based on effective exposure time information of any pixel in the image sensor in the second image exposure interval, a pixel value corresponding to the any pixel in the second image, to obtain a corrected second image; and synthesizing the first image and the corrected second image to generate the first target image. Image imbalance caused by transition state (a process from a time when the light sensing area of the image sensor moves out of the second light filter and enters the third light filter to a time when the light sensing area of the image sensor is completely covered by the third light filter) is compensated by correction.

In an embodiment, the effective exposure time information of the any pixel is obtained based on a location of the any pixel in the image sensor.

In an embodiment, the location of the any pixel in the image sensor may include coordinates (x, y) of the any pixel in the light sensing area of the image sensor. The effective exposure time information of the any pixel may include effective exposure duration T of the second time period. T meets the following expression:

$$T = \frac{\frac{\beta}{2} - \arctan\left(\frac{\frac{b}{2}-x}{y+\frac{b}{2\tan\frac{\beta}{2}}}\right)}{\omega}.$$

tan is a tangent operation. arctan is an arctangent operation. b is a side length of one side of the image sensor. $\omega$ is the rotational angular velocity of the light filtering unit. $\beta$ is the minimum center angle corresponding to the light sensing area that is in the light filtering unit and that completely covers the image sensor.

In an embodiment, the effective exposure time information of the any pixel may include the duration $T_1$ of the first time period and the effective exposure duration T of the second time period. The pixel value pixel1 corresponding to the any pixel in the second image and a pixel value pixel0 corresponding to the any pixel in the corrected second image meet the following relationship:

$$pixel0 = pixel1/\left(1+\frac{T}{T_1}\right).$$

In an embodiment, the first image may be a color image, the second image may be a grayscale image, and the first target image may be a color image.

In an embodiment, the synthesizing the first image and the second image, to generate a first target image specifically includes: registering the first image and the second image based on an optical flow between the first image and the second image, and synthesizing a registered image in the first image and the second image with another image in the first image and the second image to generate the first target image. The optical flow between the first image and the second image is obtained based on an optical flow between the first image and the third image. The first image and the second image are images obtained in a current sampling period. The third image is a color image obtained in a next sampling period of the current sampling period.

In an embodiment, when it is determined that a gain of the image sensor is greater than a preset value, the controlling the light filtering unit to transparently transmit the visible light in the incident light and block the infrared light in the incident light in the first image exposure interval, transparently transmit the infrared light in the incident light in the first time period of the second image exposure interval, and block the incident light in the second time period of the second image exposure interval is performed. The first time period is before the second time period. The method further includes: performing, by using the image sensor, photoelectric imaging on the light ray that is in the incident light and that passes through the light filtering unit in the first image exposure interval, to obtain the first image, and performing photoelectric imaging on the light ray that is in the incident light and that passes through the light filtering unit in the second image exposure interval, to obtain the second image. A high-quality image is obtained by using the solution in this application in a case of a scene of a low illumination environment.

In an embodiment, when it is determined that the gain of the image sensor is less than or equal to the preset value, the method includes: controlling the light filtering unit to transparently transmit polarized light that is in the incident light and has a preset vibration direction and block light whose vibration direction is different from the preset vibration direction, and controlling the image sensor to perform photoelectric presentation on the polarized light that has the preset vibration direction, to obtain a second target image.

In an embodiment, the photographing method provided in this application may further include: controlling, when the second image exposure interval starts, an infrared light compensation unit to generate the infrared light.

In an embodiment, when there is target object in the first image, the synthesizing the first image and the second image, to generate the first target image is performed. The photographing method provided in this application may further include: when there is no target object in the first image, using the first image as the first target image for outputting.

According to a third aspect, a computer-readable storage medium is provided, including computer software instructions. When the computer software instructions are run on a computing device, the computing device is enabled to perform the photographing method according to any one of the second aspect or the possible implementations of the second aspect.

According to a fourth aspect, a computer program product is provided. When the computer program product runs on a computing device, the computing device is enabled to perform the photographing method according to any one of the second aspect or the possible implementations of the second aspect.

It may be understood that the photographing method according to the second aspect, the computer-readable storage medium according to the third aspect, and the computer program product according to the fourth aspect respectively correspond to the photographing apparatus according to the first aspect. Therefore, for beneficial effects that can be achieved by the photographing method, the computer-readable storage medium, and the computer program product, refer to beneficial effects in the corresponding photographing apparatus provided above. Details are not described herein again.

DESCRIPTION OF EMBODIMENTS

The following describes the technical solutions in embodiments of this application with reference to the accompanying drawings in embodiments of this application. In the descriptions of this application, unless otherwise specified, "/" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this application, "a plurality of" means two or more than two. At least one of the following items (pieces) or a similar expression thereof refers to any combination of these items, including any combination of singular items (pieces) or plural items (pieces). For example, at least one of a, b, or c may represent a, b, c, a combination of a and b, a combination of a and c, a combination of b and c, or a combination of a, b, and c, where a, b, and c may be in a singular or plural form. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Currently, to obtain a visible light image and an infrared image in a scenario, and then combine the visible light image and the infrared image to obtain a high-quality target image, an image sensor that supports a plurality of types of light exposure is mostly used in an existing photographing system. In exposure intervals of different frames of the image sensor, different types of light filters are used to control types of light arriving at the image sensor, so that different types of light (for example, visible light and infrared light) arrive at the image sensor at different time. Therefore, the image sensor may separately obtain the visible light image and the infrared image in different frames, and further combine the visible light image and the infrared image to obtain the high-quality target image.

Specifically, a working principle of the image sensor is as follows: A data reading moment of each frame is configured. Between two data reading moments, an exposure start moment may be configured based on an actual requirement. The image sensor may enable a shutter at the configured exposure start moment to perform exposure, disable the shutter at a next data reading moment to end exposure, and read data to obtain a frame of image.

Figure 1:
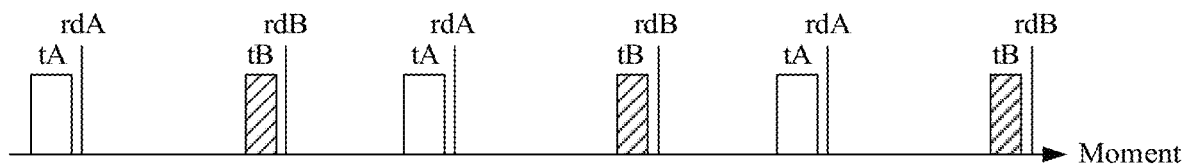
FIG. 1 is a schematic diagram of a working manner of an image sensor according to the conventional technology.

For example, FIG. 1 shows a working manner of an image sensor. As shown in FIG. 1, a data reading moment of a previous frame of the image sensor is rdA, a data reading moment of a next frame of the image sensor is rdB, and a time interval between rdA and rdB is an inherent attribute parameter of the image sensor and cannot be changed. It is assumed that an exposure interval of a previous frame is configured as tA and an exposure interval of a next frame is configured as tB based on an actual requirement. If the image sensor in a photographing system uses the working manner shown in FIG. 1, and is controlled to: transparently transmit visible light and block infrared light at the exposure interval tA, and block the infrared light at the exposure interval tB, a frame of color image may be obtained at rdA, a frame of grayscale image may be obtained at rdB. A frame of high-quality color image may be obtained by combining the color image with the grayscale image.

However, because the time interval between rdA and rdB is an inherent attribute parameter of the image sensor and cannot be changed, the time interval between the color image and the grayscale image is relatively large. If photographing is performed in a high-speed motion scenario, there is inevitably a motion error, resulting in low image accuracy.

An embodiment of this application provides a photographing apparatus. A light filtering unit included in the photographing apparatus blocks incident light after infrared light passes through in an exposure interval at which the infrared light passes through, so that the image sensor performs imaging on the infrared light earlier. This shortens a time interval between the color image and the grayscale image. In this way, when photographing is performed in the high-speed motion scenario, a motion error is reduced, and image accuracy is improved.

Figure 2:
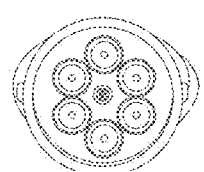
FIG. 2 is a schematic composition diagram of a photographing system according to an embodiment of this application.
Figure 2:
Figure 2:
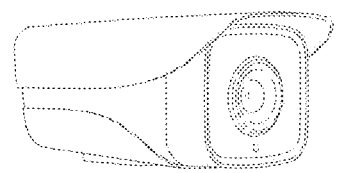

FIG. 2 is a schematic diagram of an architecture of a photographing system according to an embodiment of this application. As shown in FIG. 2, the photographing system may include at least: a photographing apparatus 201, an infrared light compensation apparatus 202, and a visible light compensation apparatus 203.

The infrared light compensation apparatus 202 is configured to emit infrared light, and perform infrared light compensation on an environmental scene in a field of view of the photographing apparatus 201, to improve illumination of the environmental scene. In an embodiment, the infrared light compensation apparatus 202 may be turned on according to control and a requirement. Alternatively, the infrared light compensation apparatus 202 may be steady on.

The visible light compensation apparatus 203 is configured to emit visible light, and perform visible light compensation on the environmental scene in the field of view of the photographing apparatus 201, to improve illumination of the environmental scene. The visible light supplement apparatus 203 may be steady on, to avoid line-of-sight interference.

The photographing apparatus 201 is configured to photograph the environmental scene in the field of view of the photographing apparatus 201 according to the solution provided in this application. Generally, in a low illumination environment such as a cloudy day, a night, or an environment with insufficient light, light compensation needs to be implemented for photographing of the photographing apparatus 201, to assist the photographing apparatus 201 in photographing a clearer image. In this embodiment of this application, visible light or infrared light may be supplemented by using a supplement light. A specific structure of the photographing apparatus 201 is described in detail in the following embodiment.

For example, the photographing system may be a traffic snapshot system. The photographing apparatus 201 may be a traffic snapshot camera. The photographing apparatus 201 may be installed on an F pole mounted above a road, to capture a traffic scenario of the road.

Figure 3:
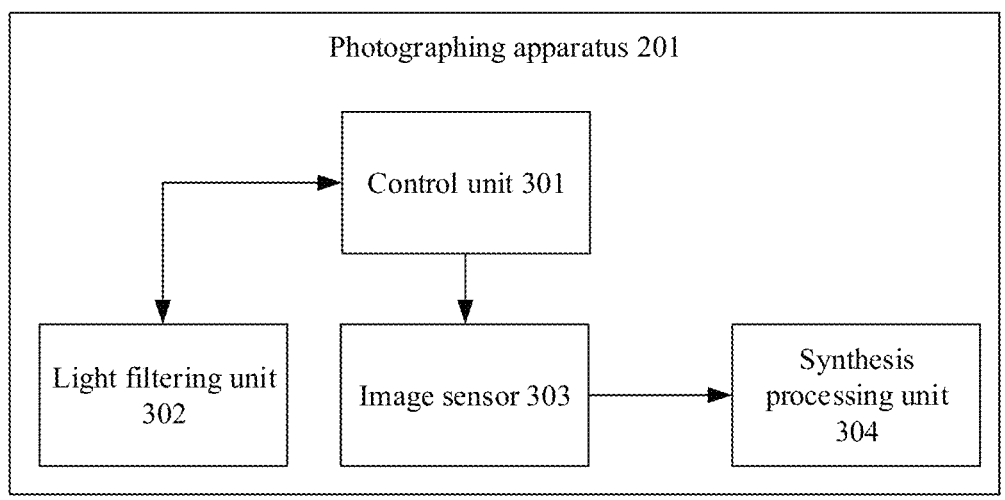
FIG. 3 is a schematic diagram of a structure of a photographing apparatus according to an embodiment of this application.

FIG. 3 is a schematic diagram of a structure of the photographing apparatus 201 according to an embodiment of this application. As shown in FIG. 3, the photographing apparatus 201 may include a control unit 301, a light filtering unit 302, an image sensor 303, and a synthesis processing unit 304.

The control unit 301 is connected to the light filtering unit 302, and is configured to control the light filtering unit 302 to: transparently transmit visible light in incident light and block infrared light in the incident light in a first image exposure interval, transparently transmit the infrared light in the incident light in a first time period of a second image exposure interval, and block the incident light in a second time period of the second image exposure interval. The first time period is before the second time period. The incident light may arrive at the image sensor after passing through the light filtering unit 302.

The control unit 301 is further connected to the image sensor 303, and is configured to control the image sensor 303 to: perform photoelectric imaging on a light ray that is in the incident light and that passes through the light filtering unit 302 in the first image exposure interval, to obtain a first image, and perform photoelectric imaging on a light ray that is in the incident light and that passes through the light filtering unit 302 in the second image exposure interval, to obtain a second image.

The synthesis processing unit 304 is configured to synthesize the first image and the second image that are obtained by the image sensor 303, to generate a first target image.

It should be noted that, although the image sensor 303 performs exposing in the second period of the second image exposure interval, because the light filtering unit 302 blocks the incident light, the image sensor 303 performs exposing in the second period of the second image exposure interval but does not generate an image.

Figure 4:
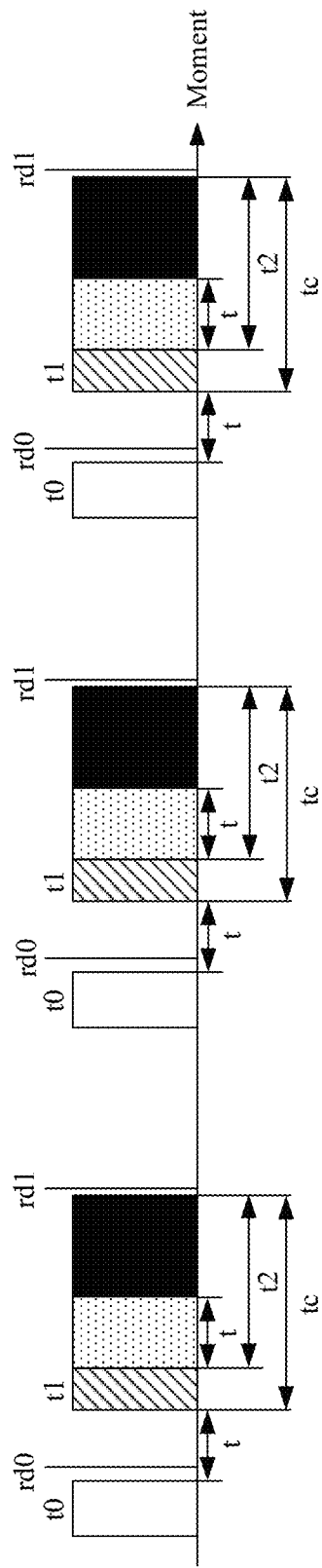
FIG. 4 is a schematic diagram of a working manner of an image sensor according to an embodiment of this application.

For example, FIG. 4 shows a working manner of the image sensor 303. As shown in FIG. 4, a data reading moment of a previous frame of the image sensor 303 is rd0, and a data reading moment of a next frame of the image sensor 303 is rd1. It is assumed that an exposure interval of the previous frame (the first image exposure interval) is t0, and an exposure interval of the next frame (the second image exposure interval) is tc. The control unit 301 controls to transparently transmit, in t0, the visible light in the incident light and the blocks infrared light in the incident light, transparently transmits, in a first time period (t1) in tc, the infrared light in the incident light, and blocks, in a second time period (t2) in tc, the incident light. In this case, a frame of the first image may be obtained in rd0, and a frame of the second image may be obtained in rd1. The first image and the second image are combined to obtain a frame of the high-quality first target image. When a light sensing area of the image sensor 303 crosses different light filters in a relative area in the light filtering unit 302, the light sensing area is referred to as a transition state, and lasts for duration t. On a premise that intervals at which the two frames of data are read by the image sensor are the same, exposure intervals between two frames of images in FIG. 1 and FIG. 4 are compared, and it can be obviously seen that the exposure intervals are greatly reduced.

According to the photographing apparatus provided in this application, the light filtering unit 302 blocks the incident light in the second time period of the second image exposure interval. When the image sensor continuously reads data for two times at a fixed time, a time interval between the second image and the first image is reduced. Therefore, a picture motion error between the first image and the second image can be reduced in a high-speed motion scenario, and accuracy of a synthesized high-quality image is improved.

For example, the image sensor 303 described in this embodiment of this application may be a global shutter sensor.

Specifically, the image sensor 303 may support an image sensor with a plurality of types of light exposure, and support at least imaging of visible light as a color image and imaging of infrared light as a grayscale image.

In some other embodiments, the first image exposure interval may be before the second image exposure interval.

The first image exposure interval and the second image exposure interval may be exposure intervals of two consecutive frames of images in the image sensor 303. The first image exposure interval and the second image exposure interval are respectively before two consecutive data reading moments of the image sensor 303.

In some other embodiments, the first image exposure interval and the second image exposure interval are in a same sampling period of the image sensor 303, and the frame rate of the photographing apparatus 201 is a quantity of sampling periods within each second.

The sampling period may be a period of obtaining a frame of the first target image. In one sampling period, a plurality of frames of images used to synthesize the first target image may be captured and obtained. For example, in this embodiment of this application, one frame of the first image and one frame of the second image are obtained as a sampling period.

In some other embodiments, the first image may be a color image, the second image may be a grayscale image, and the first target image may be a color image.

In some embodiments, the light filtering unit 302 may be of a sheet structure, and the light filtering unit 302 may include a first light filter, a second light filter, and a third light filter. The first light filter may be configured to transparently transmit the visible light and block the infrared light, the second light filter is configured to transparently transmit the infrared light, and the third light filter is configured to block the incident light.

Correspondingly, the control unit 301 may be configured to control the light filtering unit 302 to rotate, so that the first light filter is configured to filter the incident light in the first image exposure interval, the second light filter is configured to filter the incident light in the first time period of the second image exposure interval, and the third light filter is configured to filter the incident light in the second time period of the second image exposure interval.

In an embodiment, a shape of the light filtering unit 302 and a shape of the light filter included in the light filtering unit 302 may be configured based on an actual requirement (for example, an apparatus structure requirement, a working principle requirement, or others). A shape of the light filtering unit 302 and a shape of the light filter included in the light filtering unit 302 are not limited in this embodiment of this application.

It should be noted that, based on different shapes of light filters included in the light filtering unit 302, the control unit 301 may control the first light filter, the second light filter, and the third light filter of the light filtering unit 302 in different manners, provided that it can be implemented that the control unit 301 filters the incident light by using the first light filter in the first image exposure interval, filters the incident light by using the second light filter in the first time period of the second image exposure interval, and filters the incident light by using the third light filter in the second time period of the second image exposure interval, and this falls within the protection scope of this application.

For example, a shape of the light filtering unit 302 may be a circle-related shape such as a circle, a sector, a ring, or a sector ring. A shape of the first light filter, the second light filter, or the third light filter in the light filtering unit 302 is a circle or a sector ring. In this case, the light filtering unit 302 has a circle center corresponding to the light filtering unit 302.

Certainly, a shape of the first light filter, the second light filter, or the third light filter in the light filtering unit 302 and the light filtering unit 302 may also be another shape, and shapes of the first light filter, the second light filter, and the third light filter in the light filtering unit 302 may be a same type or different types. This is not limited in this embodiment of this application.

In some other embodiments, when the shape of the light filtering unit 302 is a circle-related shape such as a circle, a sector, a ring, or a sector ring, the shape of the first light filter, the second light filter, or the third light filter in the light filtering unit 302 is a circle or a sector ring. The control unit 301 may include a motor. The motor may be configured to control the light filtering unit 302 to rotate around a circle center corresponding to the light filtering unit 302, so that the first light filter directly faces a light sensing area of the image sensor 303 in the first image exposure interval, the second light filter directly faces the light sensing area of the image sensor 303 in the first time period of the second image exposure interval, and the third light filter directly faces the light sensing area of the image sensor 303 in the second time period of the second image exposure interval.

For example, a light filter with a thickness of 1 millimeter may be selected as the light filter included in the light filtering unit 302. A brushless motor with torque not less than 5 mega-Nm (mNm) may be selected. The light filter of the light filtering unit 302 may be attached to the motor rotor by using an adhesive.

The light filter directly facing the light sensing area of the image sensor 303 means that the light filter completely covers the light sensing area of the image sensor 303. To be specific, each pixel in the light sensing area of the image sensor 303 can receive the incident light filtered by the light filter.

For example, a location at which the incident light received by the pixel in the light sensing area of the image sensor 303 passes through the light filter is referred to as a relative location of the pixel in the light sensing area of the image sensor 303 in the light filter. An area formed by a set of relative locations that are of all pixels in the light sensing area of the image sensor 303 and that are in the light filter is referred to as a relative area that is of the pixels in the light sensing area of the image sensor 303 and that is in the light filter.

In an embodiment, a sum of a center angle corresponding to the second light filter and a center angle corresponding to the third light filter is $\pi$.

In an embodiment, a center angle corresponding to the first light filter may be less than or equal to $\pi$.

In some other embodiments, when the shape of the light filtering unit 302 is a circle-related shape such as a circle, a sector, a ring, or a sector ring, the shape of the first light filter, the second light filter, or the third light filter in the light filtering unit 302 is a circle or a sector ring. A rotational angular velocity of the light filtering unit 302 is $\omega$. A value of $\omega$ is equal to a product of a frame rate of the photographing apparatus 201 and $2\pi$. A center angle corresponding to the first light filter may be $\theta=\omega*t_0+\beta$. The center angle corresponding to the second light filter may be $\alpha=\omega*t_1+\beta$. $\beta$ is a minimum center angle corresponding to a light sensing area that is in the light filtering unit 302 and that completely covers the image sensor 303. $t_0$ is duration of the first image exposure interval. $t_1$ is duration of the first time period in the second image exposure interval.

In some other embodiments, the control unit 301 may be specifically configured to: when it is determined that a gain of the image sensor 303 is greater than a preset value, control the light filtering unit 302 to transparently transmit the visible light in the incident light and block the infrared light in the incident light in the first image exposure interval, transparently transmit the infrared light in the incident light in the first time period of the second image exposure interval, and block the incident light in the second time period of the second image exposure interval. The first time period is before the second time period. The control unit 301 may be specifically configured to: when it is determined that the gain of the image sensor is greater than the preset value, control the image sensor 303 to: perform photoelectric imaging on the light ray that is in the incident light and that passes through the light filtering unit 302 in the first image exposure interval, to obtain the first image, and perform photoelectric imaging on the light ray that is in the incident light and that passes through the light filtering unit in the second image exposure interval, to obtain the second image.

When the gain of the image sensor 303 is greater than the preset value, it indicates that environmental illumination is low, and scene light compensation and image synthesis need to be performed.

It should be noted that the preset value is a preset threshold used to define normal illuminance or low illuminance, and a specific value of the preset value may be set based on an actual requirement. This is not limited in this embodiment of this application.

In some other embodiments, the control unit 301 may be further configured to: when it is determined that the gain of the image sensor is less than or equal to the preset value, control the light filtering unit 302 to transparently transmit polarized light that is in the incident light and has a preset vibration direction and block light whose vibration direction is different from the preset vibration direction, and control the image sensor to perform photoelectric presentation on the polarized light that has the preset vibration direction, to obtain a second target image.

In an embodiment, when the photographing apparatus 201 is turned on and started, a motor of the control unit 301 may be locked, so that the light filtering unit 302 is still. Then, based on a value relationship between the gain of the image sensor and the preset value, when it is determined that the gain of the image sensor is less than or equal to the preset value, the control unit 301 controls the light filtering unit 302 to transparently transmit the polarized light that is in the incident light and that has the preset vibration direction, and to block light whose vibration direction is different from the preset vibration direction, and controls the image sensor 303 to perform photoelectric presentation on the polarized light that has the preset vibration direction, to obtain the second target image. When it is determined that the gain of the image sensor 303 is greater than the preset value, the control unit 301 controls the light filtering unit 302 to transparently transmit the visible light in the incident light and block the infrared light in the incident light in the first image exposure interval, transparently transmit the infrared light in the incident light in the first time period of the second image exposure interval, and block the incident light in the second time period of the second image exposure interval. The first time period is before the second time period. The control unit 301 may be specifically configured to: when it is determined that the gain of the image sensor is greater than the preset value, control the image sensor 303 to: perform photoelectric imaging on the light ray that is in the incident light and that passes through the light filtering unit 302 in the first image exposure interval, to obtain the first image, and perform photoelectric imaging on the light ray that is in the incident light and that passes through the light filtering unit in the second image exposure interval, to obtain the second image.

In another embodiment, the light filtering unit 302 may further include a fourth light filter. The fourth light filter may be a polarization light filter, and is configured to transparently transmit the polarized light that is in the incident light and has the preset vibration direction and block light whose vibration direction is different from the preset vibration direction. For example, when an image of a vehicle is photographed, filtering out polarized light can eliminate reflection of glass of a vehicle window, so that a face in the vehicle can be better seen in an obtained image.

For example, a center angle corresponding to the fourth optical filter may be $\pi-\theta$. $\theta$ is the center angle corresponding to the first light filter. The control unit 301 is further configured to control, between a first data reading moment of the image sensor 303 and a start moment of the first image exposure interval, the light filtering unit 302 to filter the incident light by using the fourth light filter. The first data reading moment of the image sensor 303 is a previous data reading moment of the first image exposure interval.

A shutter of the image sensor 303 may be turned off without exposure from the first data reading moment to the start moment of the first image exposure interval.

In some other embodiments, the light filtering unit 302 may further include a position sensor, configured to feed back position information to the control unit 301. The position information indicates a relative position between a light filter and the image sensor 303 in the light filtering unit 302, or the position information indicates a relative position between a preset mark point and the image sensor 303 in the light filtering unit 302.

In an embodiment, the position sensor may be disposed in a relative area of the light sensing area of the image sensor 303 in the light filtering unit 302.

In another embodiment, the mark point may be preset at a location that is in the light filtering unit 302 and that corresponds to a data reading moment in a sampling period of the image sensor 303.

Correspondingly, the control unit 301 may be configured to control, based on the position information fed back by the location sensor, the image sensor 303 to start or end the first image exposure interval or the second image exposure interval.

Figure 5:
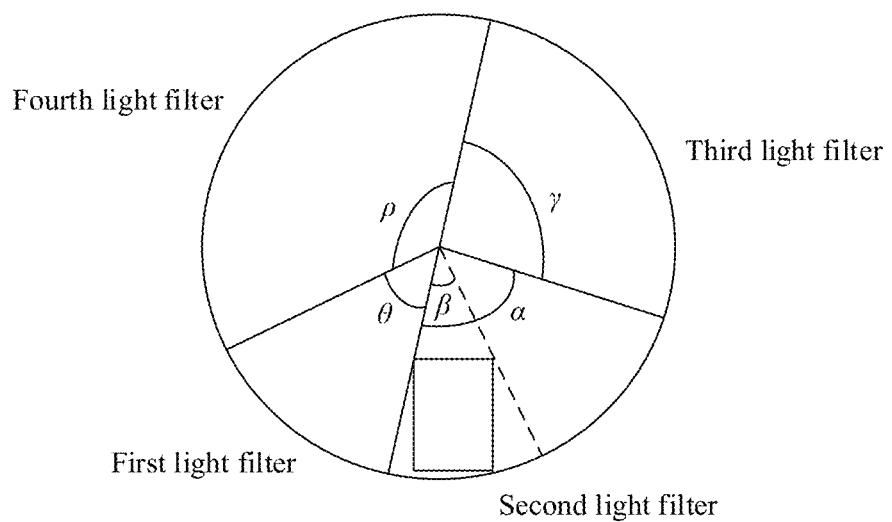
FIG. 5 is a schematic diagram of a structure of a light filtering unit according to an embodiment of this application.
Figure 6:
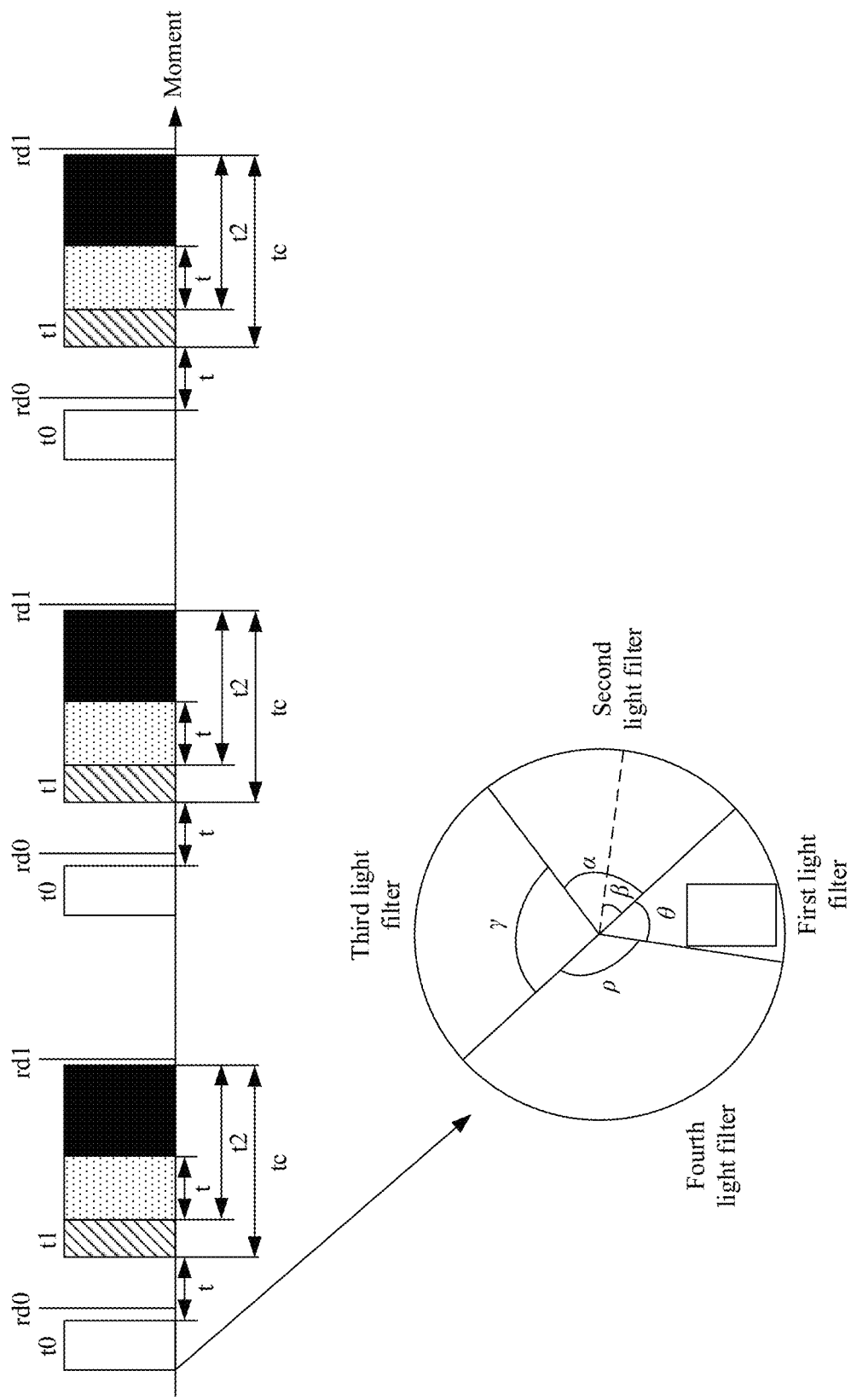
FIG. 6 to FIG. 13 are schematic diagrams of a relative position relationship between a light filtering unit and an image sensor at different moments according to an embodiment of this application.

For example, FIG. 5 shows a structure of a light filtering unit 302. A shape of the light filtering unit 302 is a circle. The light filtering unit 302 includes a first light filter, a second light filter, a third light filter, and a fourth light filter. A shape of each light filter included in the light filter is a sector shape. In the light filtering unit 302 shown in FIG. 5, the first light filter is an infrared light filter, and a center angle corresponding to the first light filter is $\theta$. The second light filter is an all-pass light filter, and a center angle corresponding to the second light filter is $\alpha$. The third light filter is a black shielding light filter, and a center angle corresponding to the third light filter is $\gamma$. The fourth light filter is a polarization light filter, and a center angle corresponding to the fourth light filter is $\rho$. A minimum center angle corresponding to the light sensing area that completely covers the image sensor and that is in the light filtering unit 302 is $\rho$. A rectangular area shown in FIG. 5 is a relative area of the light sensing area of the image sensor 303 in the light filtering unit 302.

For example, if a working manner of the image sensor 303 in the photographing apparatus 201 is shown in FIG. 4, a structure of the light filtering unit 302 in the photographing apparatus 201 is shown in FIG. 5. The control unit 302 controls the light filtering unit 302 to enable different types of light to arrive at the image sensor 303 in a time division manner. The image sensor 303 performs optical-to-electrical conversion to obtain an image. The following describes a working process of the photographing apparatus 201 with reference to FIG. 6 to FIG. 13. FIG. 6 to FIG. 13 show a relative position relationship between the light filtering unit 302 and the image sensor 303 at different moments.

Figure 7:
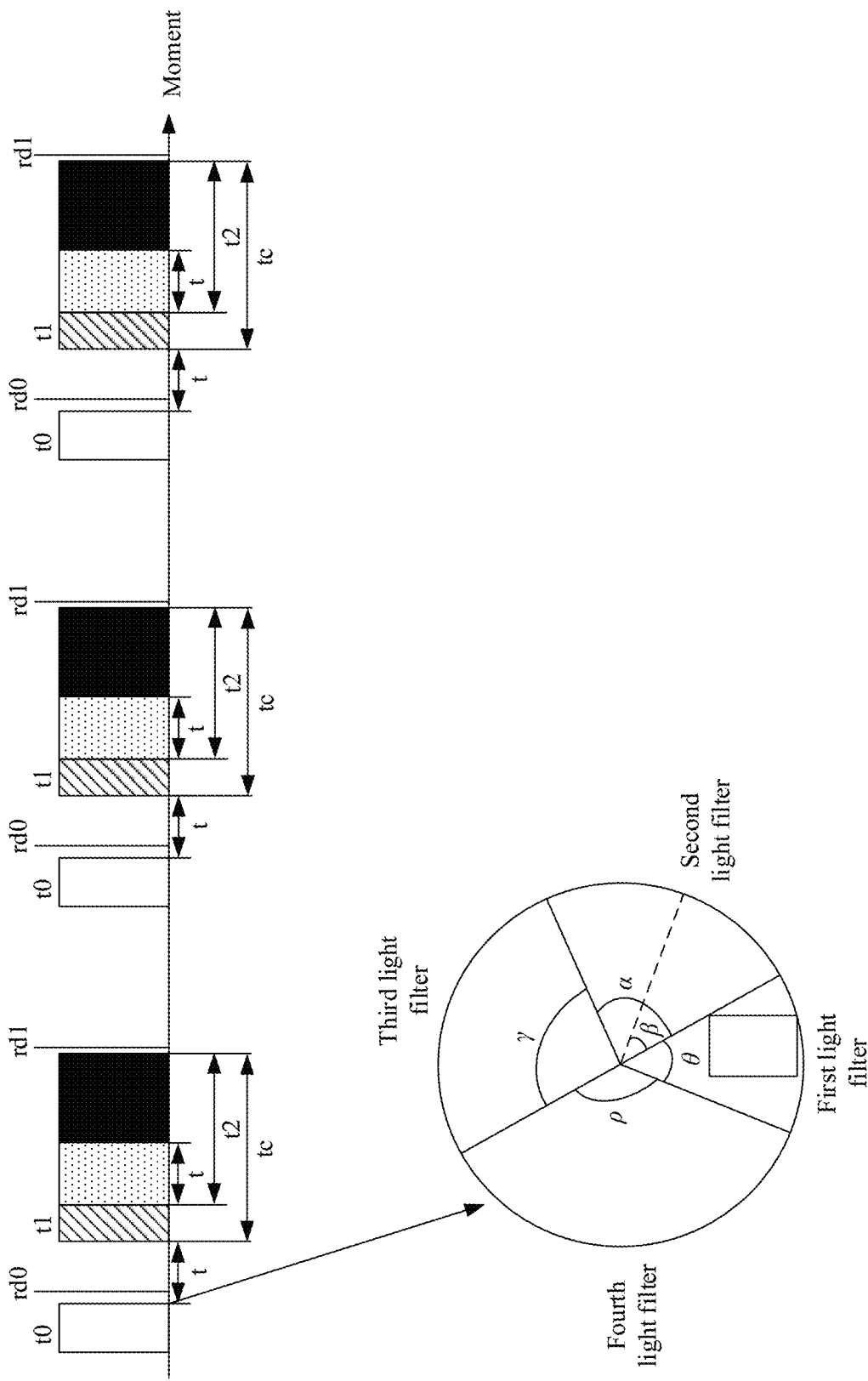

When the photographing apparatus 201 starts to work, the motor in the control unit 301 drives, at an angular speed, the light filtering unit 302 to rotate at a constant speed, and monitors (for example, based on position information fed back by the position sensor) a relative area of the light sensing area of the image sensor 303 in the light filtering unit 302. When the control unit 301 detects that the relative area has completely entered the first light filter (a position relationship shown in FIG. 6), the control unit 301 controls the image sensor 303 to turn on the shutter to enter to, and continuously exposes for duration t0. FIG. 7 shows a position relationship between relative areas of the light sensing area of the image sensor 303 in the light filtering unit 302 at the end of t0. Then, the image sensor 303 reads data from rd0 to obtain a frame of color image.

Figure 8:
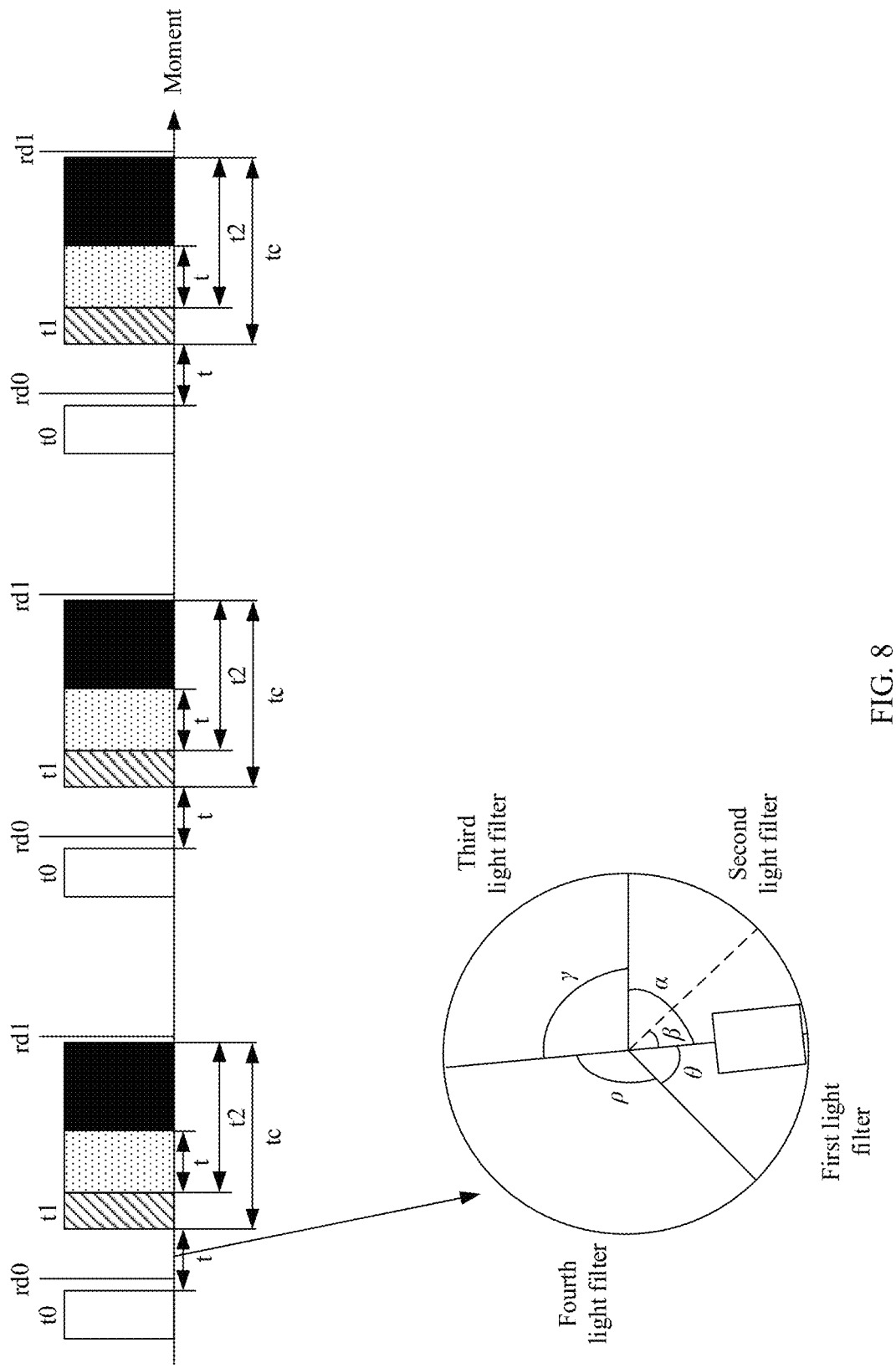

As the light filtering unit 302 rotates, between an end moment t0 and a start moment of a next tc (lasting t), a position relationship of a relative area of the light sensing area of the image sensor 303 in the light filtering unit 302 is shown in FIG. 8. A part of the light sensing area is located in the first light filter, and a part of the light sensing area is located in the second light filter. In this case, the shutter of the image sensor 303 is turned off without exposure.

Figure 9:
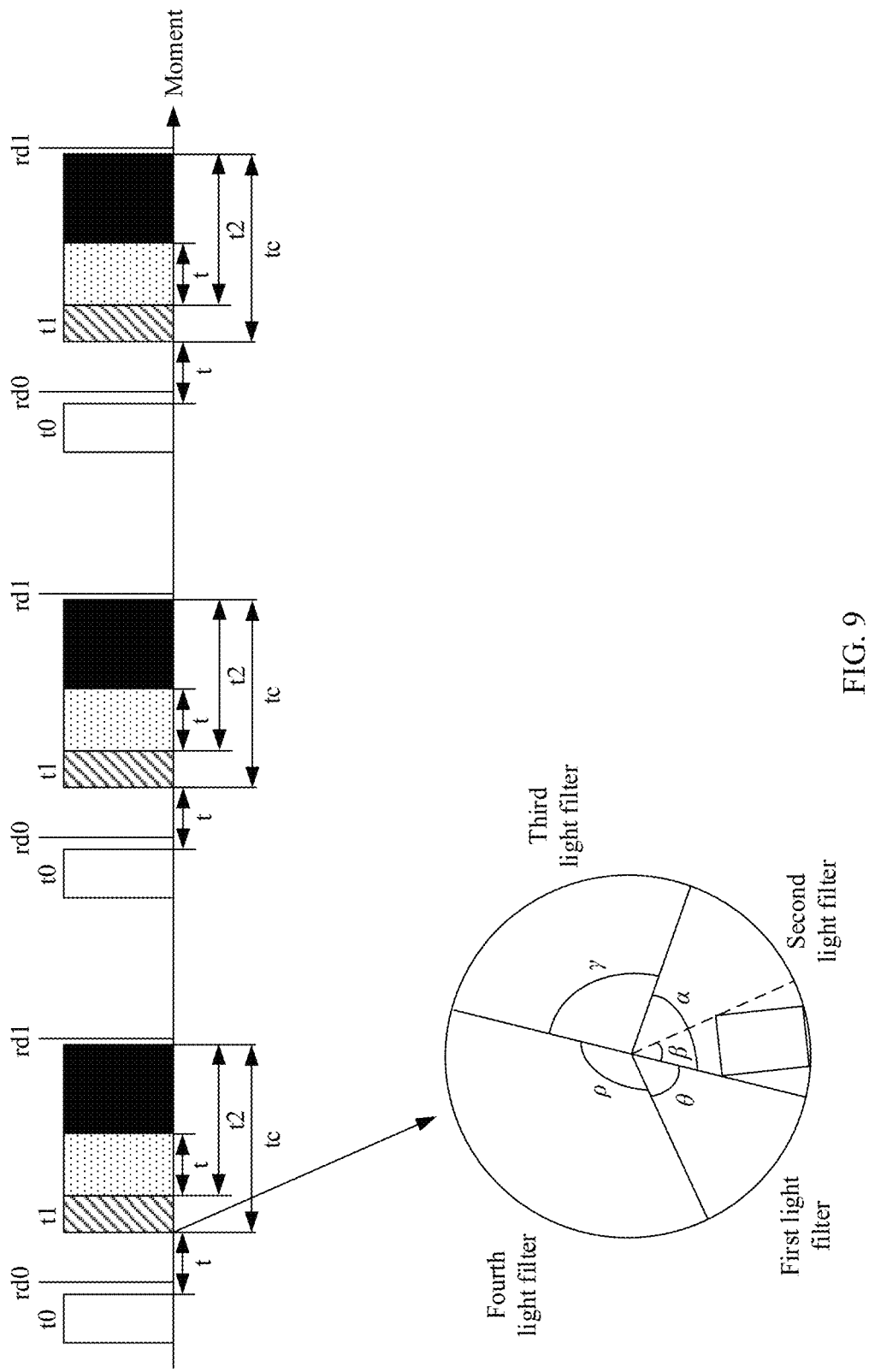
Figure 10:
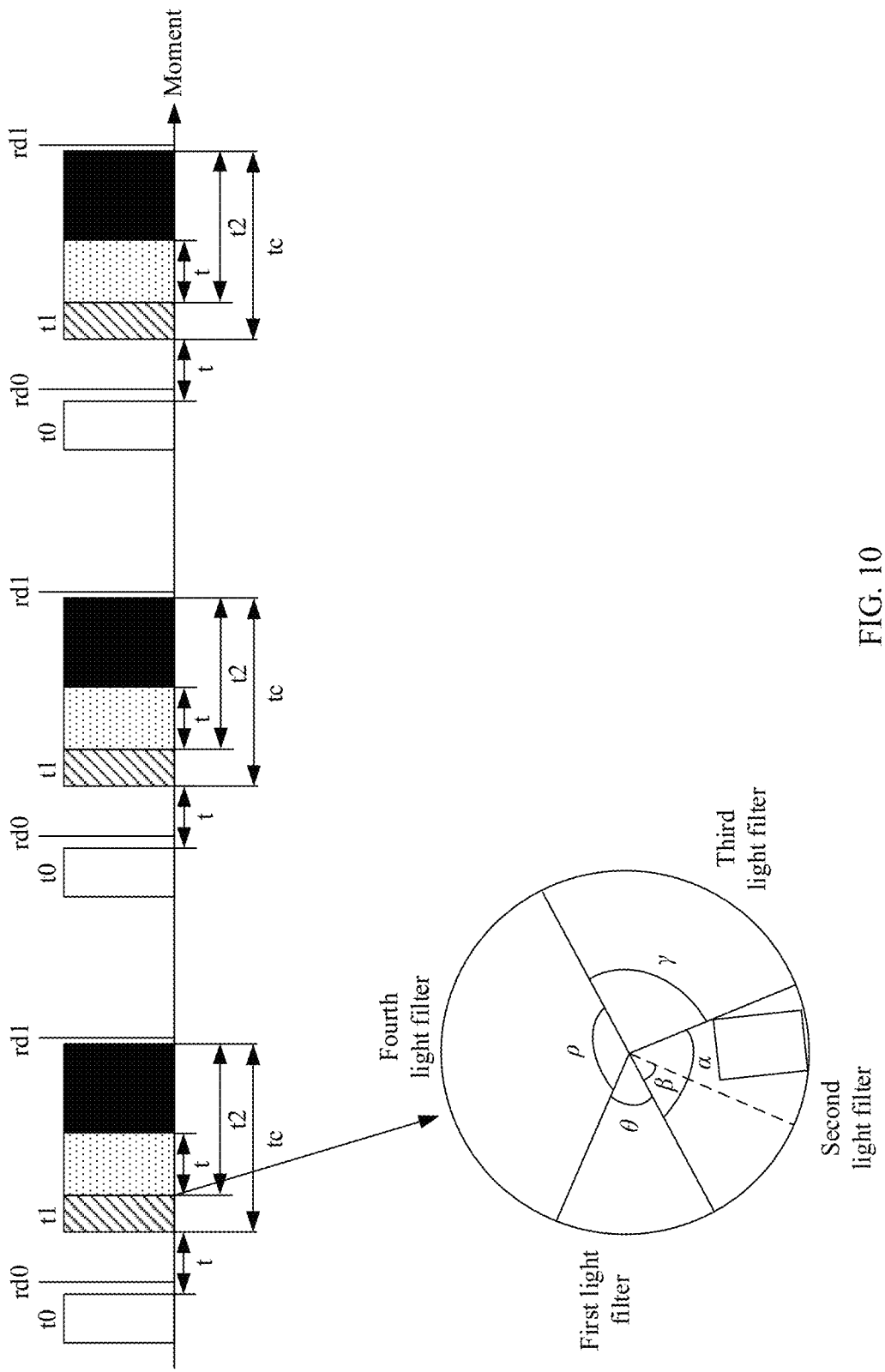

As the light filtering unit 302 rotates, at a start moment of tc, a position relationship between a relative area of the light sensing area of the image sensor 303 in the light filtering unit 302 is shown in FIG. 9. The relative area has completely entered the second light filter. The control unit 301 controls the image sensor 303 to turn on the shutter to enter tc, and continuous exposes for duration tc. When a first time period t1 of tc ends, a relative area of the light sensing area of the image sensor 303 in the light filtering unit 302 is shown in FIG. 10.

Figure 11:
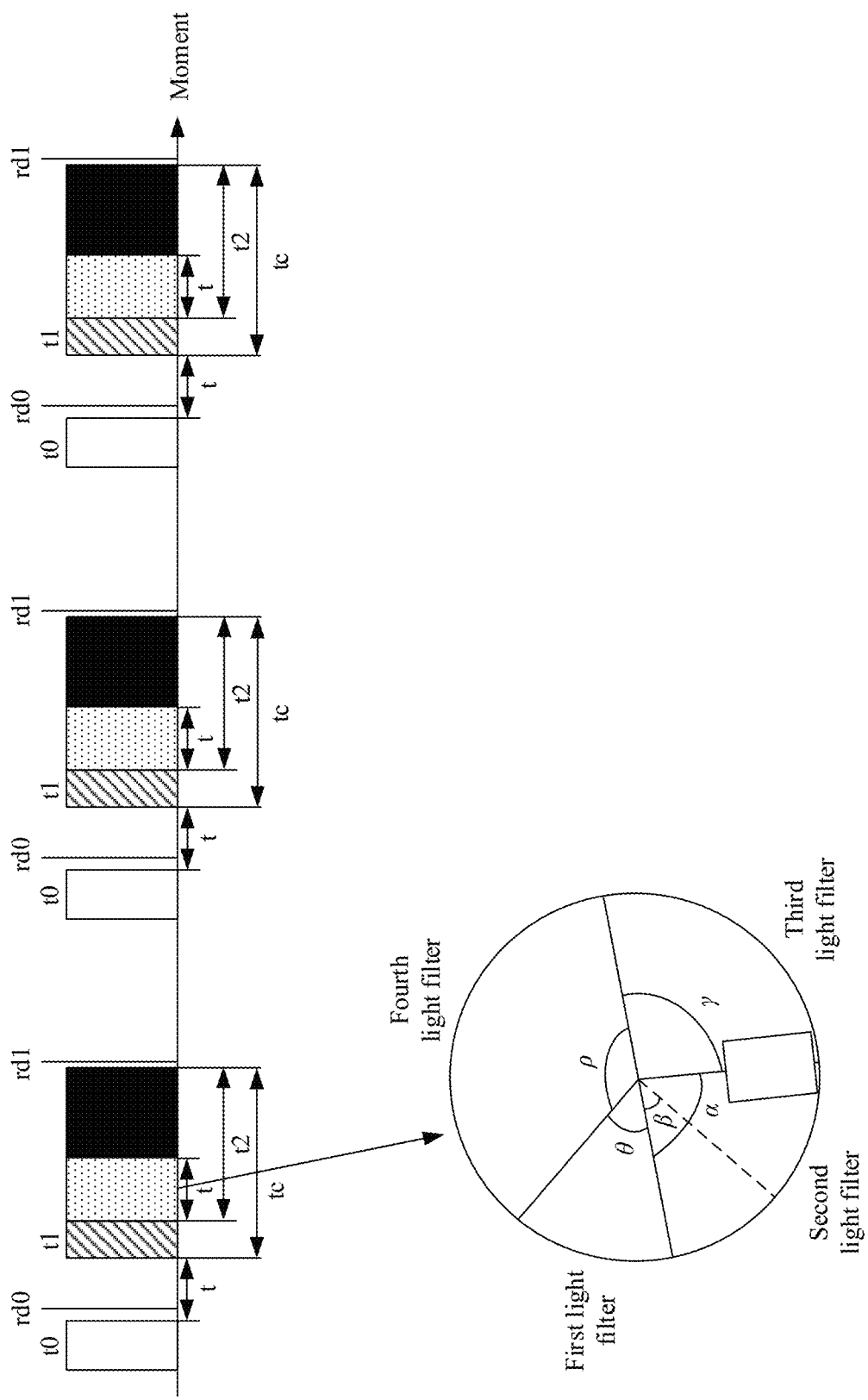

As the light filtering unit 302 rotates, at the beginning of a period of time (t in the figure) of a second time period t2 of tc, a position relationship between a relative area of the light sensing area of the image sensor 303 in the light filtering unit 302 is shown in FIG. 11. A part of the light sensing area is located in the second light filter, and a part of the light sensing area is located in the third light filter. In this case, the shutter of the image sensor 303 still exposes, and a relative area of the light sensing area of the image sensor 303 in the light filtering unit 302 is partially located in the second light filter and partially located in the third light filter, which is referred to as a transition state.

Figure 12:
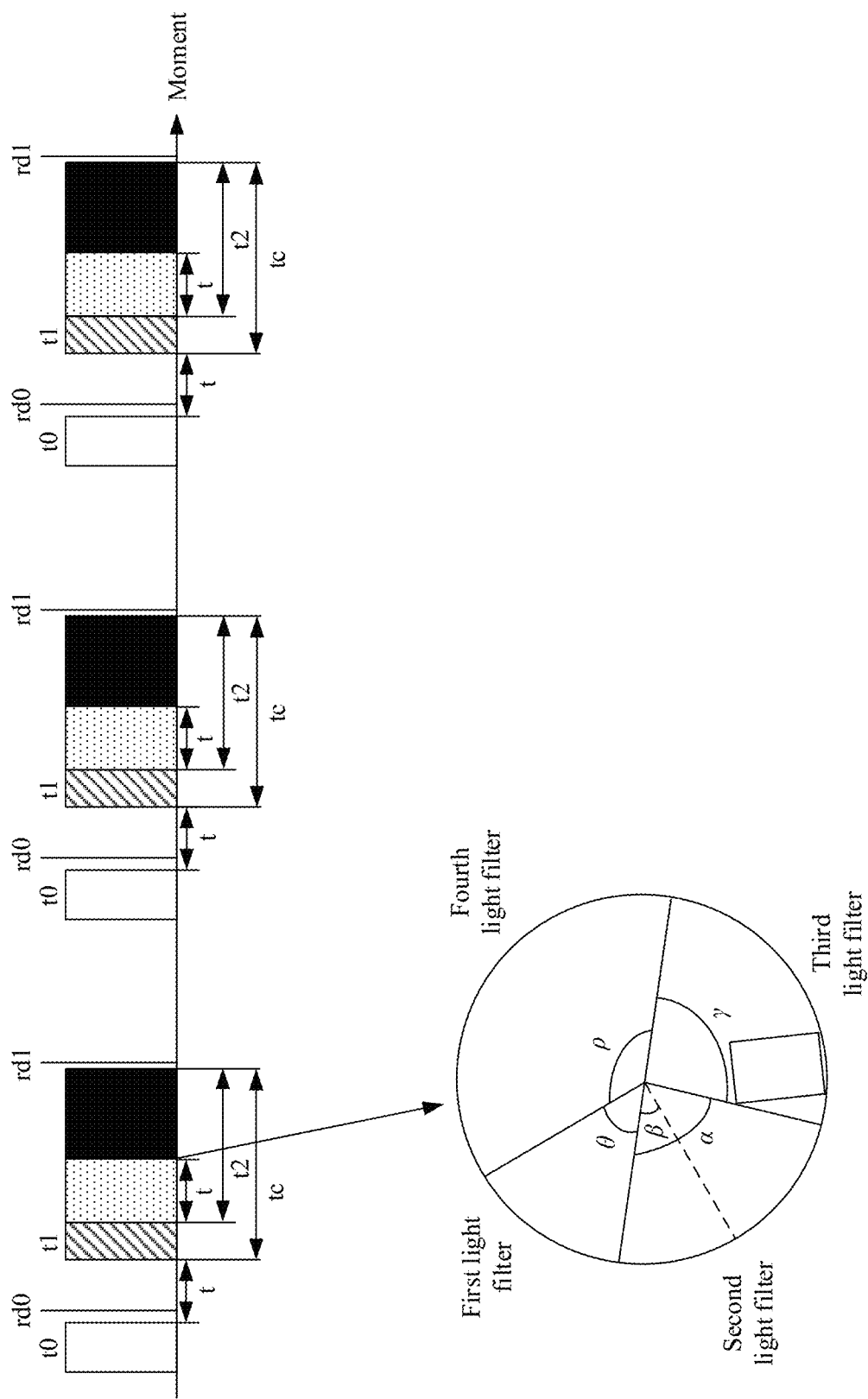
Figure 13:
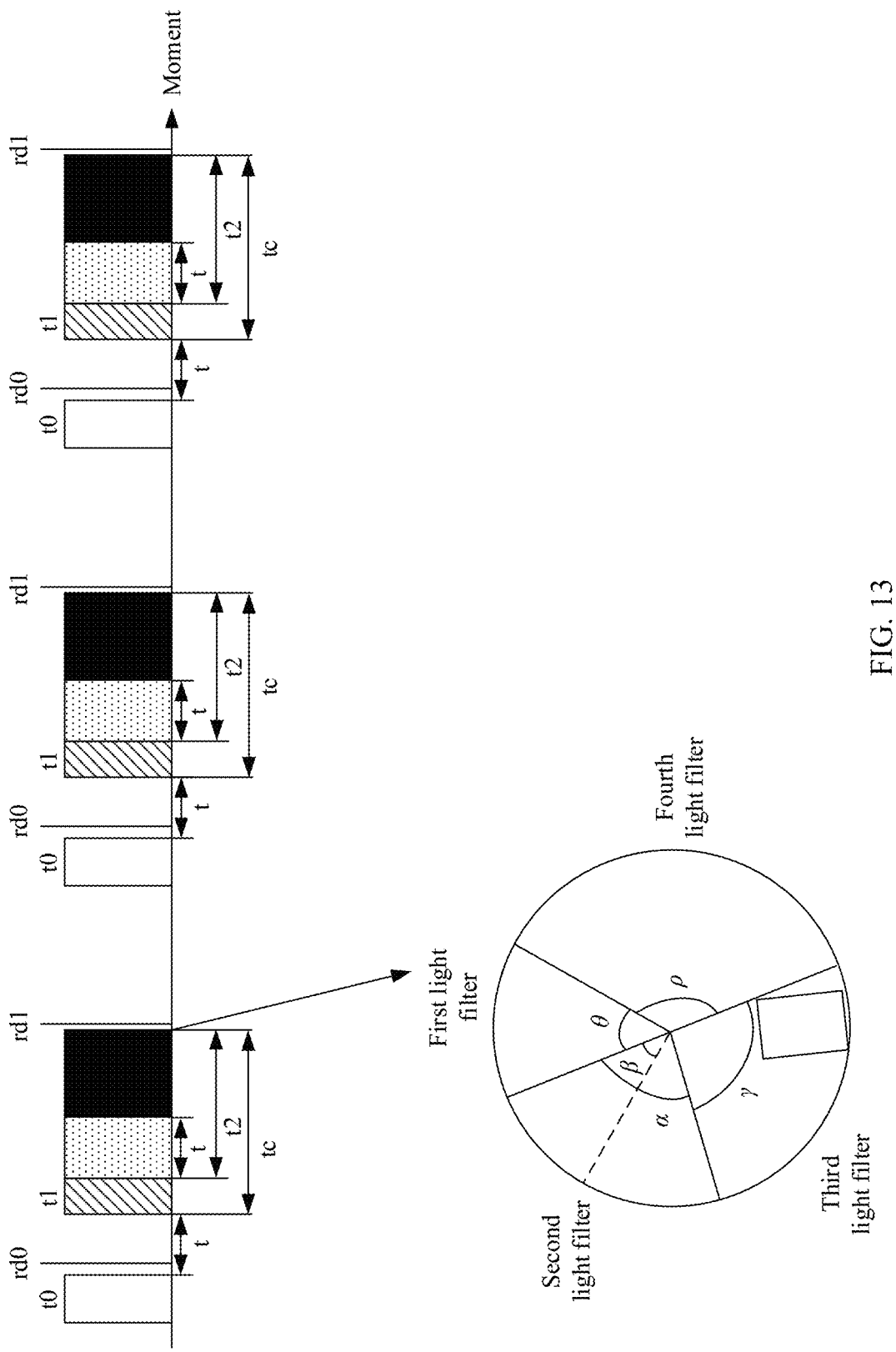

As the light filtering unit 302 rotates, in a remaining time period (t2−t) of the second time period t2 of tc, a position relationship between a relative area of the light sensing area of the image sensor 303 in the light filtering unit 302 is shown in FIG. 12. The relative area has completely entered the third light filter, and the image sensor 303 still exposes. However, because the third light filter blocks the incident light, the image sensor 303 does not receive the incident light in the remaining time period of t2, and does not generate an image signal. FIG. 13 shows a position relationship between the relative area of the light sensing area of the image sensor 303 in the light filtering unit 302 at the end of t2. Then, the image sensor 303 reads data from rd1 to obtain a frame of grayscale image. The grayscale image obtained by the image sensor 303 by reading data at rd1 is an image corresponding to data obtained after optical-to-electrical conversion performed by the image sensor at t1 and in a transition phase.

It can be learned from the schematic diagrams in FIG. 6 to FIG. 13 that, by using the third light filter, exposure time of data read at rd1 is advanced from close to rd1 to close to rd0, thereby greatly reducing an exposure interval between two frames of images.

For example, configuration parameter of the photographing apparatus 201 is described by using an example in which the first image is a color image and the second image is a grayscale image under infrared light. It is assumed that a color video frame rate required by a service of the photographing apparatus 201 is 25 frames/second. A maximum exposure time requirement of a color frame and an infrared frame is 4 milliseconds (that is, the first image exposure interval is 4 milliseconds, and the second time period in the second image exposure interval is 4 milliseconds). A radius R of the light filtering unit 302 is 40 millimeters. A length c of a selected image sensor 303 is 14.5 millimeters and a width b of the image sensor 303 is 10.8 millimeters. When the light filtering unit 302 is of the structure shown in FIG. 5, the following geometric relationship exists:

$$\omega = 50\pi/\text{second};$$

$$\alpha + \gamma + \rho + \theta = 2\pi;$$

$$\alpha = \omega * t_1 + \beta;$$

$$\gamma = \pi - \alpha;$$

$$\theta = \omega * t_0 + \beta;$$

$$\rho = \pi - \theta;$$

$R=b/(2\sin(\beta/2))+c$, b is a width of the image sensor 303, and c is a length of the image sensor 303;

$t=\beta/\omega$, t is the duration of the transition state; and
according to derivation, $\beta=2*\arcsin(b/(2*(R-c)))$;

it is known that R=40, and then t=2.72 ms.

It is known that $t_0=t_1=4$ milliseconds, and the following may be obtained through calculation according to the foregoing known geometric relationship:

$\beta=24.5°$, $\alpha=\theta=60.5°$, and $\gamma=\rho=119.6°$.

Further, in some special scenarios (for example, there are a large quantity of infrared light rays in the scenario), the foregoing transition state affects image brightness to some extent. A boundary between the third light filter and the second light filter of the light filtering unit 302 is scanned from an upper right corner of the image sensor 303 to an upper left corner in a clockwise direction. In this way, effective exposure time of each pixel in the image sensor 303 is different, causing uneven images due to poor brightness. A phenomenon of image unevenness caused by the transition state of the light filtering unit 302 may be compensated.

Figure 14:
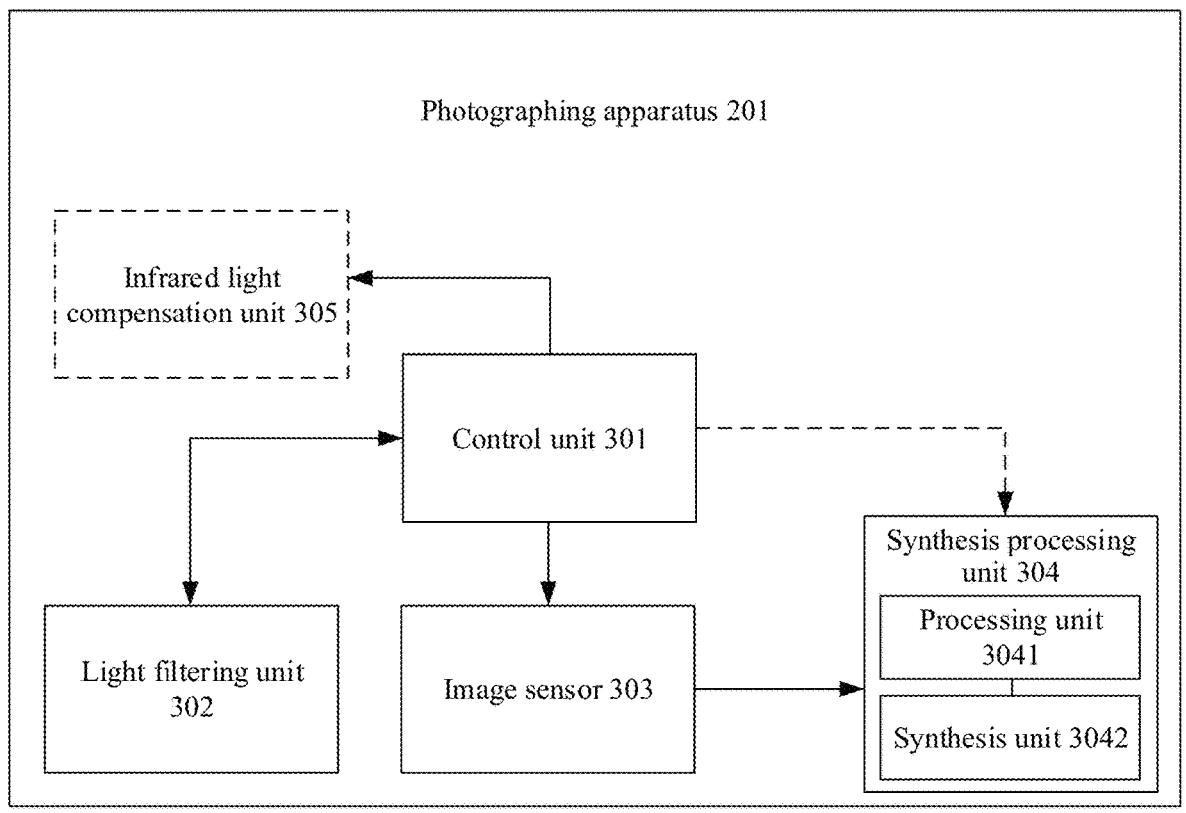
FIG. 14 is a schematic diagram of a structure of another photographing apparatus according to an embodiment of this application.

In some other embodiments, as shown in FIG. 14, the synthesis processing unit 304 may include a processing unit 3041 and a synthesis unit 3042. The processing unit 3041 may be configured to: correct, based on effective exposure time information of any pixel in the image sensor 303 in the second image exposure interval, a pixel value corresponding to the any pixel in the second image, to obtain a corrected second image. The synthesis unit 3042 is configured to synthesize the first image and the corrected second image to generate the first target image.

The effective exposure time information may indicate effective exposure duration of any pixel in the image sensor in the second image exposure interval.

In the second image exposure interval, exposure duration of any pixel in the image sensor 303 is duration of the second image exposure interval. However, because the third filter in the light filtering unit 302 blocks incident light, in the first time period of the second image exposure interval, any pixel in the image sensor 303 may receive the incident light that passes through the second light filter, and in the second time period of the second image exposure interval. A pixel in the image sensor 303 first receives the incident light that passes through the second light filter. After a relative position of the pixel in the light filtering unit 302 (a position of the light filtering unit 302 through which the incident light received by the pixel passes) is in the third light filter, the pixel cannot receive incident light. Therefore, the pixel can receive incident light in a part of the second time period of the second image exposure interval, and cannot receive incident light in another time period. For the pixel, even if the pixel is in the exposure interval, exposure when no incident light is received is not effective exposure. Therefore, the effective exposure time is an effective exposure time in the second image exposure interval. Exposure duration in which the incident light can be received by the pixel in the second period of the second image exposure interval may be defined as effective exposure duration of the pixel in the second period. It should be understood that the effective exposure duration of the pixel in the second period depends on a location of the pixel in the image sensor 303.

In an embodiment, effective exposure time information of any pixel in the image sensor 303 may include effective exposure duration of the any pixel in the second period.

In an embodiment, the effective exposure time information of the any pixel in the image sensor 303 may include the duration of the first time period and the effective exposure duration of the any pixel in the second time period.

Specifically, the effective exposure time information of the any pixel in the image sensor 303 may be obtained based on a location of the any pixel in the image sensor 303.

In an embodiment, it is assumed that the location of the any pixel in the image sensor 303 includes coordinates (x, y) of the any pixel in the light sensing area of the image sensor 303. The effective exposure time information of the any pixel may include effective exposure duration T of the second time period, T meets the following expression:

$$T = \frac{\dfrac{\beta}{2} - \arctan\left(\dfrac{\dfrac{b}{2}-x}{y+\dfrac{b}{2\tan\dfrac{\beta}{2}}}\right)}{\omega}.$$

tan is a tangent operation. arctan is an arctangent operation. b is a side length of one side of the image sensor 303. $\omega$ is the rotational angular velocity of the light filtering unit 302. $\beta$ is the minimum center angle corresponding to the light sensing area that is in the light filtering unit 302 and that completely covers the image sensor 303.

Figure 15:
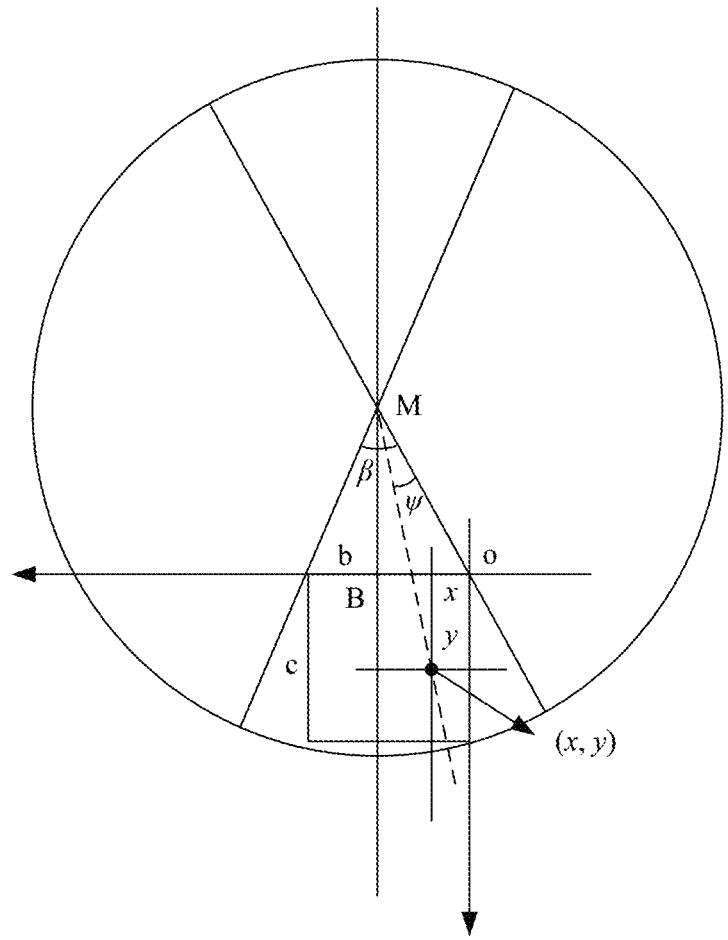
FIG. 15 is a schematic diagram of a coordinate system of any pixel in a light sensing area of an image sensor according to an embodiment of this application.

The location of the any pixel in the image sensor may include coordinates (x, y) of the any pixel in the light sensing area of the image sensor. Origin coordinates corresponding to a coordinate system in which the coordinates are located may be a pixel location that first faces the third light filter in the light sensing area of the image sensor 303. FIG. 15 shows a coordinate system of any pixel in the light sensing area of the image sensor 303. Coordinates of an origin corresponding to the coordinate system may be O in FIG. 15.

With reference to the coordinate system shown in FIG. 15, the following known geometric relationships may be obtained:

$T=\psi/\omega$, where $\psi$ is a center angle corresponding to a horizontal coordinate of a pixel;

$\tan\left(\dfrac{\beta}{2}\right)=(b/2)/MB$, where MB is a distance from point M to point B in FIG. 15, and b is a width of a light sensing area of the image sensor 303;

It may be further deduced that:

$\tan\left(\dfrac{\beta}{2}-\psi\right)=(b/2-x)/(y+MB)$;

and $\beta=2*\arctan(b/(2*(R-c)))$, where c is a width of the light sensing area of the image sensor 303.

It may be further deduced that:

$$T = \frac{\frac{\beta}{2} - \arctan\left(\frac{\frac{b}{2} - x}{y + \frac{b}{2\tan\frac{\beta}{2}}}\right)}{\omega}$$

In an embodiment, the effective exposure time information of the any pixel in the image sensor 303 include the duration $T_1$ of the first time period and the effective exposure duration T of the second time period. The pixel value pixel1 corresponding to the any pixel in the second image and a pixel value pixel0 corresponding to the any pixel in the corrected second image meet the following relationship:

$$pixel0 = pixel1/\left(1 + \frac{T}{T_1}\right).$$

$1+T/T_1$ may be referred to as a correction coefficient of a pixel.

Further, a correction coefficient $1+T/T_1$ of each pixel in the image sensor 303 may constitute a positive matrix of the second image, and the second image is divided by a correction matrix to obtain the corrected second image.

Further, in an embodiment, when the photographing apparatus 201 photographs a person (a person or an object) moving at a high speed, motion displacement is caused, and the synthesis processing unit 304 may be further configured to: register the first image and the second image based on an optical flow between the first image and the second image, and synthesize a registered image in the first image and the second image with another image in the first image and the second image to generate the first target image.

The optical flow between the first image and the second image is obtained based on an optical flow between the first image and the third image. The first image and the second image are images obtained in a current sampling period. The third image is a color image obtained in a next sampling period of the current sampling period.

For example, the synthesis processing unit 304 may obtain, by using an optical flow algorithm, the optical flow between the first image and the third image, to obtain the optical flow between the first image and the second image. A specific type of the optical flow algorithm is not limited in this embodiment of this application.

Figure 16:
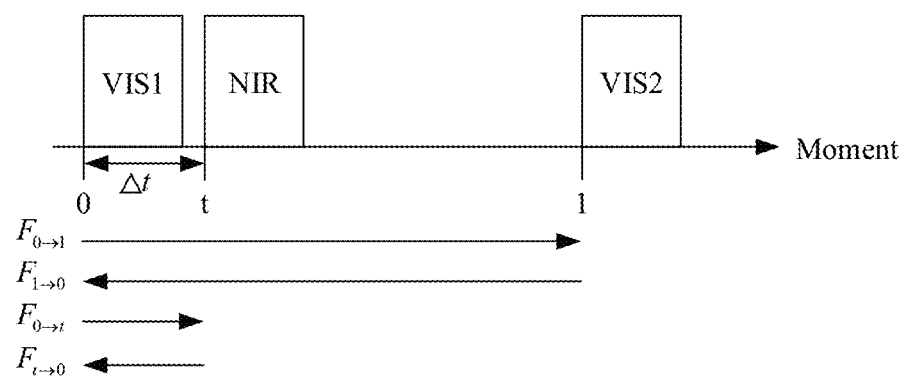
FIG. 16 is a schematic diagram of a photographing scenario according to an embodiment of this application.

For example, in a photographing scenario shown in FIG. 16, a VIS1 (a first image) and a VIS2 (a third image) represent two frames of color images in two adjacent sampling periods, and an NIR (a second image) is an infrared frame adjacent to the VIS1. It is assumed that a sampling period interval tf of the photographing apparatus 201 is 40 ms, exposure duration of a color frame is 1 ms, and a transition state time is 2.72 ms, Δ=3.72 ms. A forward optical flow $F_{0\to1}$ and a backward optical flow $F_{1\to0}$ of the color image can be calculated from the images VIS1 and VIS2. With reference to tf, a forward optical flow $F_{0\to1}=\Delta t*F_{0\to1}/tf$ and a backward optical flow $F_{t\to0}=\Delta t*F_{1\to0}/tf$ at time t may be calculated. If the forward optical flow at the moment t is known, each pixel in the VIS1 may be offset based on the forward optical flow, to perform registration with the NIR. If the backward optical flow at the moment t is known, each pixel in the NIR may be offset based on the backward optical flow, to perform registration with the VIS1.

In some other embodiments, as shown in FIG. 14, the photographing apparatus 201 may further include an infrared light compensation unit 305. The infrared light compensation unit 305 is connected to the control unit 301. The control unit 301 is further configured to control, when the second image exposure interval starts, the infrared light compensation unit 305 to generate infrared light.

In an embodiment, the control unit 301 is further configured to control, when the second image exposure interval ends, the infrared light compensation unit 305 to stop generating infrared light.

In some other embodiments, the control unit 301 is further configured to: when the second image exposure interval starts, send an instruction signal to an infrared light compensation unit to generate the infrared light. The infrared light compensation unit is connected to the photographing apparatus 201, and is configured to provide infrared light compensation for the photographing apparatus 201.

In some other embodiments, as shown in FIG. 14, the synthesis processing unit 304 may include a processing unit 3041 and a synthesis unit 3042. The processing unit 3041 may be configured to determine whether there is a target object in the first image. The synthesis unit 3042 is configured to: when there is the target object in the first image, synthesize the first image and the second image, to generate the first target image. The synthesis unit 3042 is further configured to: when there is no target object in the first image, use the first image as the first target image for outputting.

In an embodiment, the synthesis unit 3042 is further configured to discard the second image if there is no target object in the first image.

The target object may be a predefined person, object, or vehicle.

In some other embodiments, as shown in FIG. 14, the control unit 301 may be further connected to the synthesis processing unit 304, and is configured to control a synthesis operation of the synthesis processing unit 304.

For example, the control unit 301 may notify the synthesis processing unit 304 that a current frame is a visible light frame or an infrared frame.

In some other embodiments, the synthesis processing unit 304 may synthesize the first image and the second image by using an image fusion algorithm.

For example, the synthesis processing unit 304 may use chroma information of the first image as chroma information of the first target image, and use brightness information of the second image as brightness information of the first target image, to obtain the first target image.

It should be noted that the photographing apparatus 201 shown in FIG. 3 or FIG. 14 is merely an example, and a specific structure of the photographing apparatus 201 is not specifically limited.

It should be noted that, in actual application, implementations of the units in the photographing apparatus 201 may be designed based on an actual requirement. This is not specifically limited in this embodiment of this application.

For example, the control unit 301 may be implemented by using a CPU driver and an FPGA. The processing unit 3041 in the synthesis processing unit 304 may be implemented by using an application specific integrated circuit (ASIC). The synthesis unit 3042 may be implemented by using a digital signal processor (DSP).

It may be understood that a structure of the photographing apparatus 201 shown in this embodiment of this application does not constitute a specific limitation on the photographing apparatus 201. In some other embodiments, the photographing apparatus 201 may further include another component. For example, the photographing apparatus 201 may further include a lens, a storage module, a communication interface, and the like. The lens is configured to converge incident light, and the storage module may be configured to store computer executable program code, where the executable program code includes instructions. The communication interface may be configured to connect to another device, thereby ensuring system scalability.

In some other embodiments, the photographing apparatus 201 may be a terminal device, and the terminal device may be a mobile phone, a PAD, or another portable mobile device.

Figure 16A:
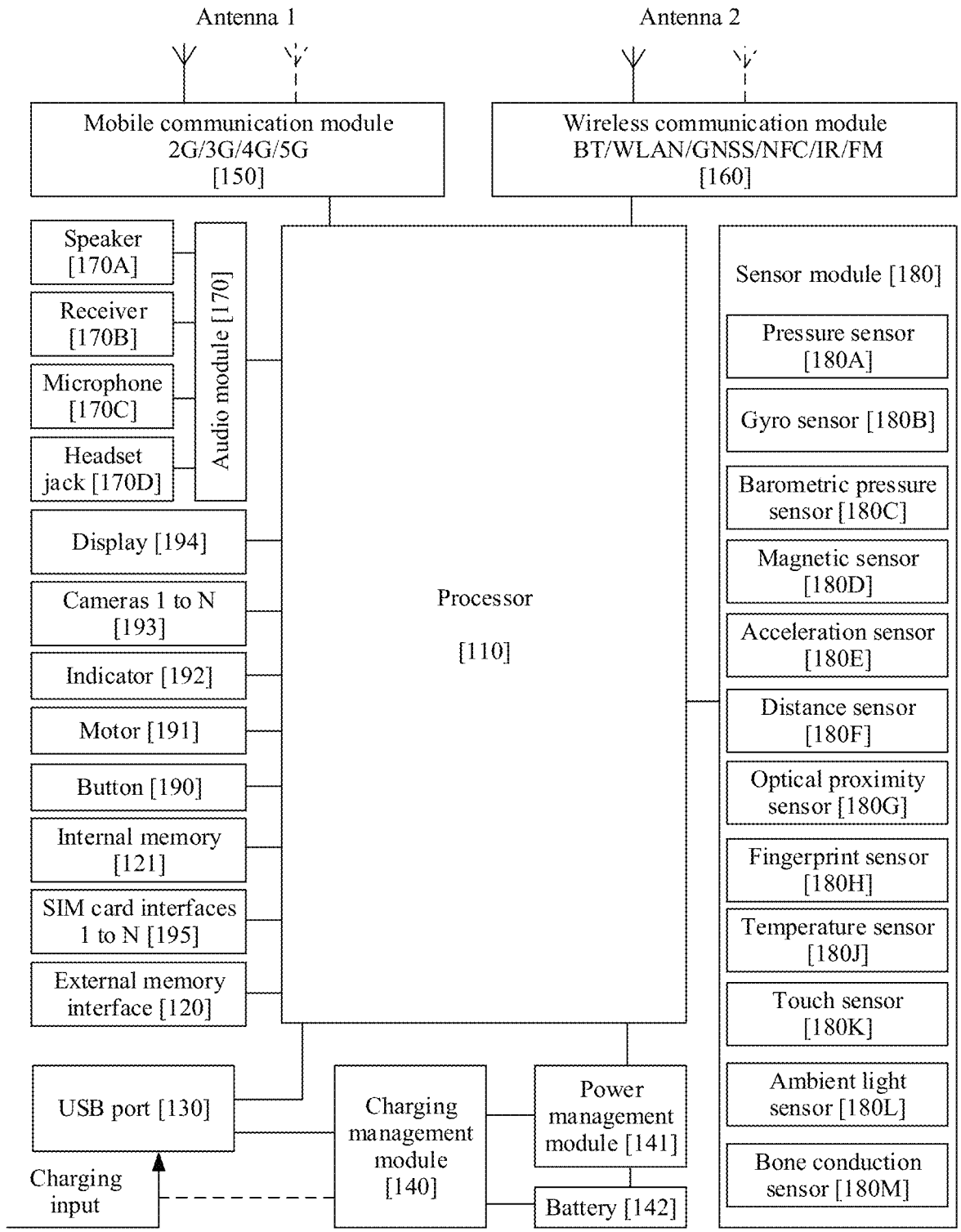
FIG. 16a is a schematic diagram of a structure of an electronic device according to an embodiment of this application.

FIG. 16a is a schematic diagram of a structure of another terminal device according to an embodiment of this application. A structure of the electronic device in which the photographing apparatus 201 is located may be shown in FIG. 16a.

As shown in FIG. 16a, the electronic device may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include one or more of an application processor (AP), a modem processor, a graphics processing unit (GPU), an image signal processor (ISP), a controller, a memory, a video codec, a DSP, a baseband processor, and a neural-network processing unit (NPU). Different processing units may be independent components, or may be integrated into one or more processors.

The controller may be a nerve center and a command center of the electronic device. The controller may generate an operation control signal based on an instruction operation code and a time sequence signal, to complete control of instruction reading and instruction execution. The controller may be the foregoing control unit 301. For specific implementation of the controller, refer to the description of the foregoing control unit 301. Details are not described herein again.

The processor 110 may further implement a function of the foregoing synthesis processing unit 305. For a specific implementation, refer to the specific description of the foregoing synthesis processing unit 305. Details are not described herein again.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include one or more of an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and the like.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device. The charging management module 140 supplies power to the electronic device through the power management module 141 while charging the battery 142.

The power management module 141 is configured to connect the battery 142 and the charging management module 140 to the processor 110. The power management module 141 receives input of the battery 142 and the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery status of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device and that includes a second-generation mobile phone communication technology (2G)/, a third-generation mobile phone communication technology (3G)/, a fourth-generation mobile phone communication technology (4G)/, a fifth-generation mobile phone communication technology (5G), and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another function module.

The wireless communication module 160 may provide wireless communication solutions, applied to the electronic device, for example, a wireless local area network (WLAN) (such as a wireless fidelity (Wi-Fi) network), Bluetooth (BT), a global navigation satellite system (GNSS), frequency modulation (FM), near field communication (NFC), and an infrared (IR) technology. The wireless communication module 160 may be one or more components integrating at least one communication processing module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with the network and another device by using a wireless communication technology. For example, the electronic device may perform a video call or a video conference with another electronic device through the antenna 1 and the mobile communication module 150. The wireless communication technology may include one or more of a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and the like. The GNSS may include one or more of a global positioning system (GPS), a global navigation satellite system (GLONASS), a BeiDou navigation satellite system (BDS), a quasi-zenith satellite system (QZSS), a satellite based augmentation system (SBAS), and the like.

The electronic device implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), or the like. In some embodiments, the mobile device may include one or N displays 194, where N is a positive integer greater than 1. For example, in this embodiment of this application, when the user performs photographing by using the electronic device, the display screen 194 may display a first target image.

The electronic device may implement an image shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The digital signal processor is configured to process a digital signal. For example, a human body monitoring and tracking algorithm is used for a digital video image, and after a subject person in the video image is determined, corresponding cropping and zooming are performed on the video image to obtain an image that adapts to a display specification of the receive end device.

The video codec is configured to compress or decompress a digital video. The electronic device may support one or more video codecs. In this way, the electronic device may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by drawing on a structure of a biological neural network, for example, by drawing on a transfer mode between human brain neurons, and may further continuously perform self-learning. The NPU can implement applications such as intelligent cognition of the electronic device, for example, image recognition, facial recognition, voice recognition, and text understanding.

The photosensitive element in the camera lens 193 may be the foregoing image sensor 303. The camera lens 193 may further include a light filtering unit. A light ray of an object passing through the lens passes through the light filtering unit to generate an optical image, and the optical image is projected to the photosensitive element. For specific implementation of the light filtering unit included in the camera lens 193, refer to the specific implementation of the light filtering unit 302. Details are not described herein again.

The photosensitive element in the camera 193 may support an image sensor with a plurality of types of light exposure, and at least support imaging of visible light as a color image and imaging of infrared light as a grayscale image.

In an embodiment, the controller in the processor 110 may control the light filtering unit in the camera 193 to transparently transmit visible light in incident light and block infrared light in the incident light in a first image exposure interval, transparently transmit the infrared light in the incident light in a first time period of a second image exposure interval, and block the incident light in a second time period of the second image exposure interval. The first time period is before the second time period. In addition, the controller in the processor 110 may control the photosensitive element in the camera 193 to perform photoelectric imaging on a light ray that is in the incident light and that passes through the light filtering unit in the first image exposure interval, to obtain a first image, and perform photoelectric imaging on a light ray that is in the incident light and that passes through the light filtering unit in the second image exposure interval, to obtain a second image.

In another embodiment, the camera lens 193 may further include an infrared light compensation unit, configured to provide infrared light compensation for a scene photographed by the electronic device. For specific implementation of the infrared light compensation unit included in the camera 193, refer to the specific implementation of the infrared light compensation unit 305. Details are not described herein again.

For example, the controller in the processor 110 may control, when the second image exposure interval starts, the infrared light compensation unit in the camera 193 to generate infrared light.

The external memory interface 120 may be configured to connect to an external storage card, for example, a micro SD card, to extend a storage capability of the electronic device. The external memory card communicates with the processor 110 through the external memory interface 120, to implement a data storage function. For example, files such as music and videos are stored in the external storage card.

The internal memory 121 may be configured to store computer-executable program code.

The executable program code includes instructions. The processor 110 runs the instructions stored in the internal memory 121, to perform various function applications of the electronic device and data processing. The internal memory 121 may include a program storage area and a data storage area. The program storage area may store an operating system, an application required by at least one function (such as a sound playing function or an image playing function), and the like. The data storage area may store data (such as audio data and a phone book) created when the electronic device is used, and the like. In addition, the internal memory 121 may include a high-speed random access memory, and may further include a nonvolatile memory such as at least one magnetic disk storage device, a flash memory, or a universal flash storage (UFS).

The electronic device may implement an audio function such as music playing and recording by using the audio module 170, the speaker 170A, the receiver 170B, the microphone 170C, the headset jack 170D, the application processor, and the like. For example, the audio function includes call, music playback, and recording.

The audio module 170 is configured to convert digital audio information into an analog audio signal for output, and is also configured to convert analog audio input into a digital audio signal.

The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device may be used to listen to music or answer a hands-free call by using the speaker 170A.

The receiver 170B, also referred to as an "earpiece", is configured to convert an electrical audio signal into a sound signal. When a call is answered or voice information is received by using the electronic device, the telephone receiver 170B may be put close to a human ear to receive a voice.

The microphone 170C, also referred to as a "mike" or a "mic", is configured to convert a sound signal into an electrical signal. When making a call, sending voice information, or needing to trigger, by using a voice assistant, the electronic device to perform some functions, the user may make a sound by putting the mouth close to the microphone 170C, and input a sound signal to the microphone 170C. At least one microphone 170C may be disposed in the electronic device. In some other embodiments, two microphones 170C may be disposed in the electronic device, to implement a noise reduction function, in addition to capturing a sound signal. In some other embodiments, three, four, or more microphones 170C may alternatively be disposed in the electronic device, to capture a sound signal and reduce noise. The microphones may further identify a sound source, to implement a directional recording function, and the like.

The headset jack 170D is configured to connect to a wired headset. The headset jack 170D may be the USB interface 130, or may be a 3.5 mm open mobile platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the electronic device. In some embodiments, angular velocities of the electronic device around three axes (namely, axes x, y, and z) may be determined by using the gyro sensor 180H. The gyro sensor 180B may be configured to implement image stabilization during photographing. For example, when a shutter is pressed, the gyroscope sensor 180B detects a jitter angle of the electronic device, calculates, based on the angle, a distance for which a lens module needs to compensate, and enables the lens to offset jitter of the electronic device through reverse motion, to implement image stabilization. The gyro sensor 180B may also be used in a navigation scenario and a somatic game scenario.

The barometric pressure sensor 180C is configured to measure barometric pressure. In some embodiments, the electronic device calculates an altitude based on a barometric pressure value measured by the barometric pressure sensor 180C, to assist in positioning and navigation.

The magnetic sensor 180D includes a Hall sensor. The electronic device may detect opening and closing of a flip cover by using the magnetic sensor 180D. In some embodiments, when the electronic device is a flip phone, the electronic device may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitude of accelerations in various directions (usually on three axes) of the electronic device. and may detect magnitude and a direction of gravity when the electronic device is still. The acceleration sensor 180E may be further configured to identify a posture of the electronic device, and is used in an application such as switching between a landscape mode and a portrait mode or a pedometer.

The distance sensor 180F is configured to measure a distance. The electronic device may measure the distance through infrared or laser. In some embodiments, in a photographing scenario, the electronic device may measure the distance by using the distance sensor 180F, to implement quick focusing.

The optical proximity sensor 180G may include, for example, a light-emitting diode (LED) and an optical detector, for example, a photodiode. The light emitting diode may be an infrared light emitting diode. The electronic device emits infrared light by using the light-emitting diode. The electronic device detects reflected infrared light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device is in a pocket, to avoid an unintentional touch.

The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a touch panel. The touch sensor 180K may be disposed in the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the electronic device, and is located at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or or may be a touch button. The electronic device may receive a button input, and generate a button signal input related to user settings and function control of the electronic device.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or be separated from the electronic device. The electronic device may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device interacts with a network by using the SIM card, to implement functions such as calling and data communication. In some embodiments, the electronic device uses an eSIM, namely, an embedded SIM card. The eSIM card may be embedded into the electronic device, and cannot be separated from the electronic device.

Figure 17:
FIG. 17 is a schematic diagram of a photographing effect according to an embodiment of this application.
Figure 17:
Figure 17:
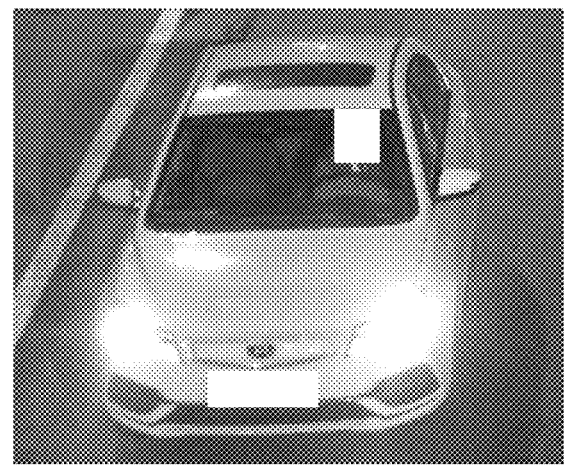
Figure 18:
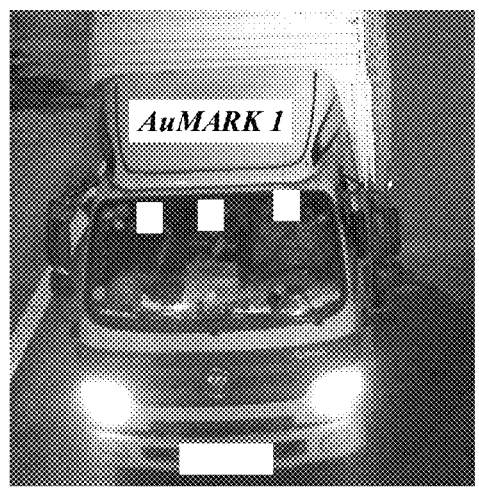
FIG. 18 is a schematic diagram of another photographing effect according to an embodiment of this application.
Figure 18:
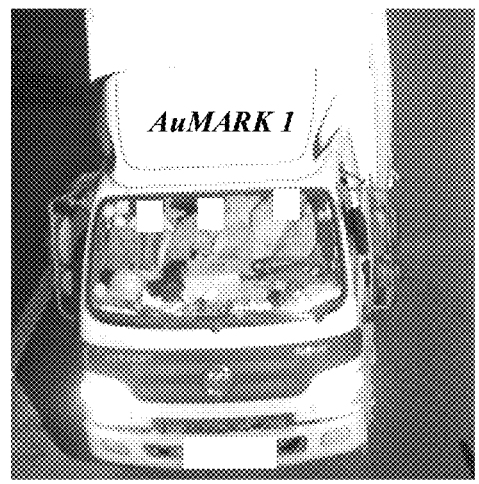
Figure 18:
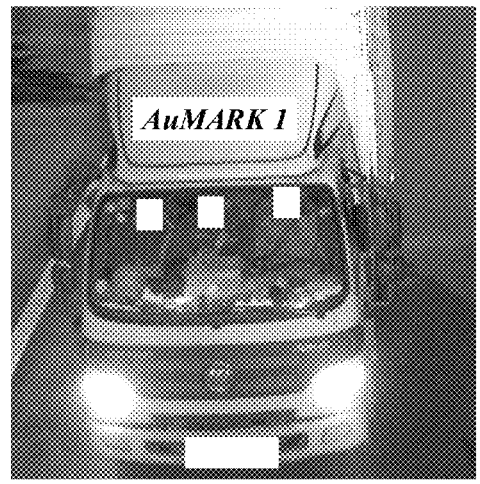

FIG. 17 and FIG. 18 show photographing effects, and show a first image, a second image, and a fused first target image that are photographed by the photographing apparatus 201 according to this embodiment of this application.

Figure 19:
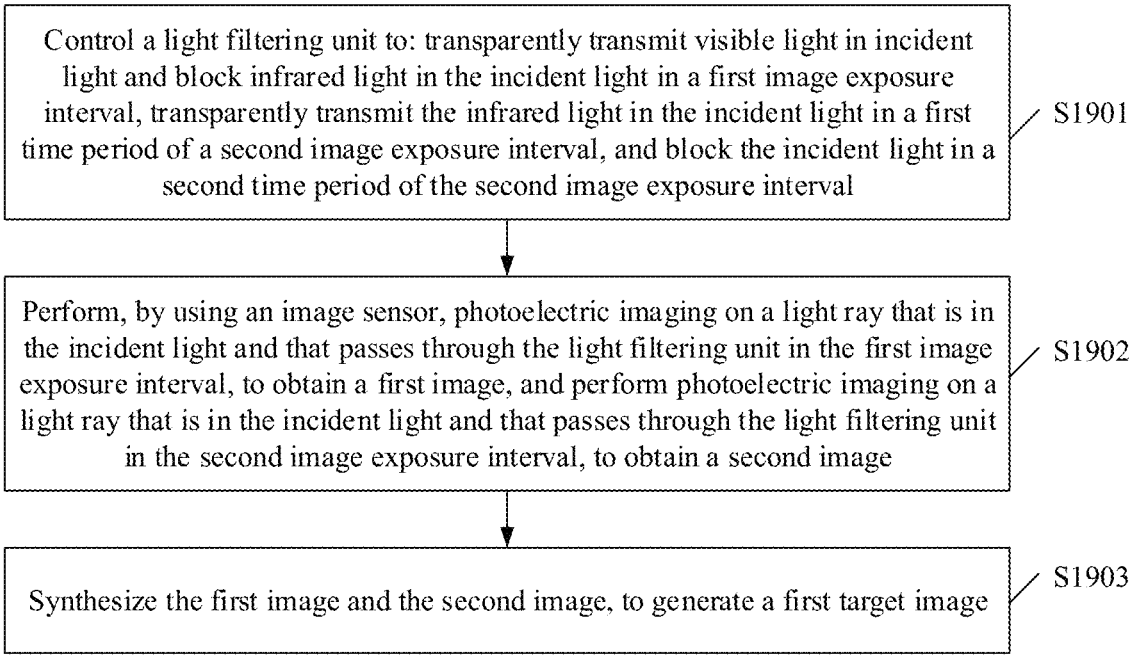
FIG. 19 is a schematic flowchart of a photographing method according to an embodiment of this application.

FIG. 19 is a schematic flowchart of a photographing method according to an embodiment of this application. The method may be applied to the photographing apparatus 201 shown in FIG. 3 or FIG. 14. A structure of the photographing apparatus 201 has been described in detail in the foregoing embodiment, and details are not described herein again. As shown in FIG. 19, the method may include the following operations.

Operation S1901: Control a light filtering unit to: transparently transmit visible light in incident light and block infrared light in the incident light in a first image exposure interval, transparently transmit the infrared light in the incident light in a first time period of a second image exposure interval, and block the incident light in a second time period of the second image exposure interval.

The first image exposure interval may be before the second image exposure interval. The first time period may be before the second time period.

In an embodiment, the first image exposure interval and the second image exposure interval are in a same sampling period of the image sensor, and a quantity of sampling periods within each second is a frame rate corresponding to a synthesized first target image.

In an embodiment, the light filtering unit is of a sheet structure. The light filtering unit includes a first light filter, a second light filter, and a third light filter. The first light filter may be configured to transparently transmit the visible light and block the infrared light, the second light filter is configured to transparently transmit the infrared light, and the third light filter is configured to block the incident light. Operation S1901 may be specifically implemented as follows: controlling the light filtering unit to rotate, so that the first light filter is configured to filter the incident light in the first image exposure interval, the second light filter is configured to filter the incident light in the first time period, and the third light filter is configured to filter the incident light in the second time period.

It should be noted that, for a working manner and a principle of the light filtering unit, refer to the description of the light filtering unit 302 in the foregoing embodiment, and details are not described herein again.

Operation S1902: Perform, by using an image sensor, photoelectric imaging on a light ray that is in the incident light and that passes through the light filtering unit in the first image exposure interval, to obtain a first image, and perform photoelectric imaging on a light ray that is in the incident light and that passes through the light filtering unit in the second image exposure interval, to obtain a second image.

The first image may be a color image, and the second image may be a grayscale image.

Operation S1903: Synthesize the first image and the second image, to generate a first target image.

The first target image may be a color image.

Specifically, in operation S1903, the photographing apparatus may use chroma information of the first image as chroma information of the first target image, and use brightness information of the second image as brightness information of the first target image, to obtain the first target image.

In an embodiment, operation S1903 may be specifically implemented as: correcting, based on effective exposure time information of any pixel in the image sensor in the second image exposure interval, a pixel value corresponding to the any pixel in the second image, to obtain a corrected second image; and synthesizing the first image and the corrected second image, to generate the first target image.

In another embodiment manner, operation S1903 may be further specifically implemented as: registering the first image and the second image based on an optical flow between the first image and the second image, and synthesizing a registered image in the first image and the second image with another image in the first image and the second image to generate the first target image.

The optical flow between the first image and the second image may be obtained based on an optical flow between the first image and the third image. The first image and the second image are images obtained in a current sampling period. The third image is a color image obtained in a next sampling period of the current sampling period.

It should be noted that for specific implementation of operation S1903, refer to the specific implementation of the foregoing synthesis processing unit 304. Details are not described herein again.

It should be further noted that in operation S1903, both correction and registration may be performed, and a sequence of the two may be configured based on an actual requirement. This is not limited in this embodiment of this application.

According to the photographing method provided in this application, the photographing apparatus controls the light filtering unit to block the incident light in the second time period of the second image exposure interval. When the image sensor continuously reads data for two times at a fixed time, a time interval between the second image and the first image is reduced. Therefore, a picture motion error between the first image and the second image can be reduced in a high-speed motion scenario, and accuracy of a synthesized high-quality image is improved.

Further, in an embodiment, the photographing method provided in this embodiment of this application may further include: obtaining position information by using a position sensor, where the position information indicates a relative position between a light filter and the image sensor in the light filtering unit, or the position information indicates a relative position between a preset mark point and the image sensor in the light filtering unit; and controlling, based on the position information, the image sensor to start or end the first image exposure interval or the second image exposure interval.

Figure 20:
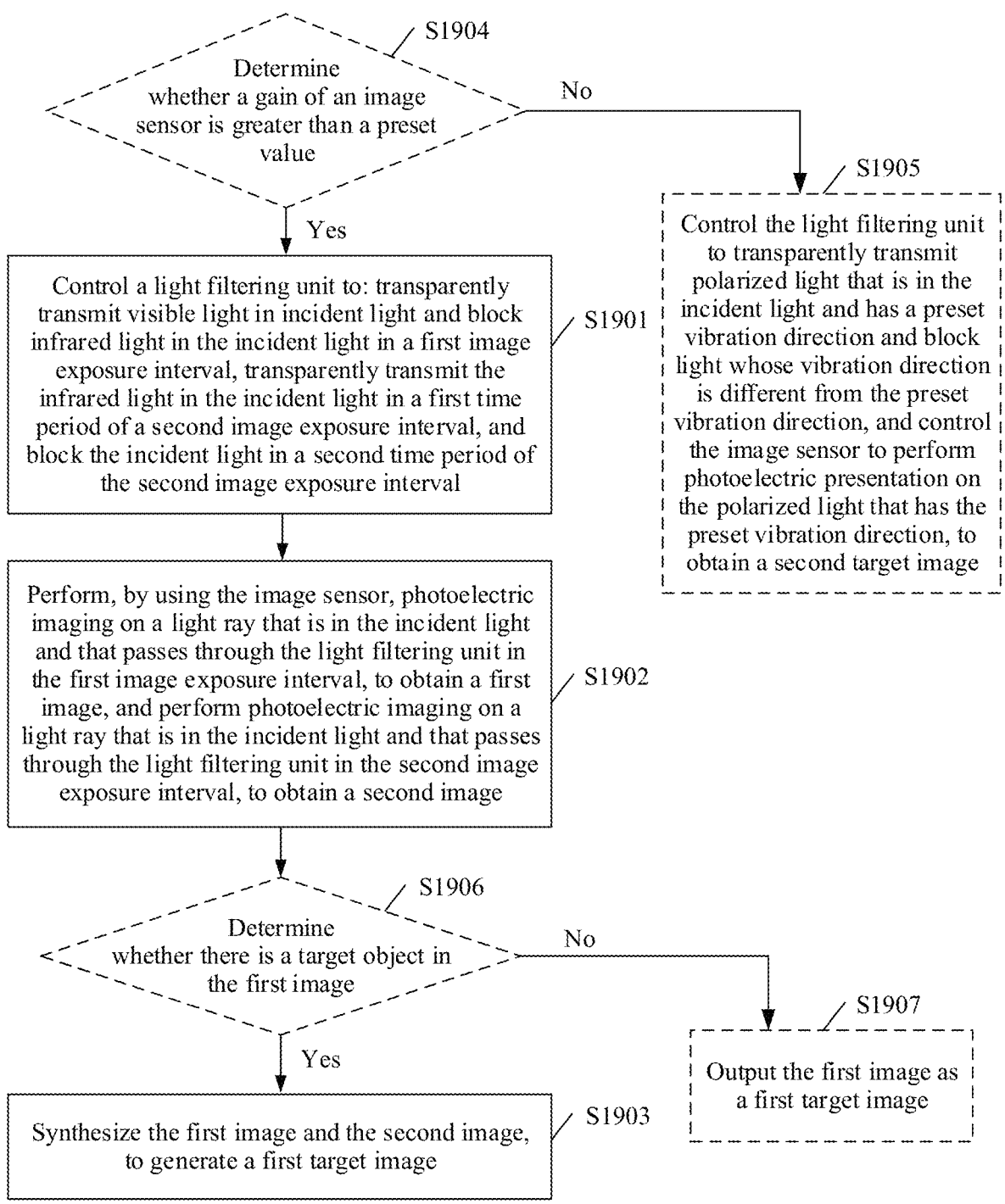
FIG. 20 is a schematic flowchart of another photographing method according to an embodiment of this application.

Further, as shown in FIG. 20, before operation S1901, the photographing method provided in this embodiment of this application may further include operation S1904.

Operation S1904: Determine whether a gain of the image sensor is greater than a preset value.

In an embodiment, after operation S1904, operation S1901 is performed only when it is determined that the gain of the image sensor is greater than the preset value.

Correspondingly, operation S1901 may be specifically implemented as follows: when it is determined that the gain of the image sensor is greater than the preset value, the controlling the light filtering unit to transparently transmit the visible light in the incident light and block the infrared light in the incident light in the first image exposure interval, transparently transmit the infrared light in the incident light in the first time period of the second image exposure interval, and block the incident light in the second time period of the second image exposure interval is performed. The first time period is before the second time period. Operation S1901 may be specifically implemented as follows: performing, by using the image sensor, photoelectric imaging on the light ray that is in the incident light and that passes through the light filtering unit in the first image exposure interval, to obtain the first image, and performing photoelectric imaging on the light ray that is in the incident light and that passes through the light filtering unit in the second image exposure interval, to obtain the second image.

In another embodiment, after operation S1904, operation S1905 may be performed when it is determined that the gain of the image sensor is less than or equal to the preset value.

Operation S1905: Control the light filtering unit to transparently transmit polarized light that is in the incident light and has a preset vibration direction and block light whose vibration direction is different from the preset vibration direction, and control the image sensor to perform photoelectric presentation on the polarized light that has the preset vibration direction, to obtain a second target image.

In yet another possible implementation, after operation S1904, when it is determined that the gain of the image sensor is less than or equal to the preset value, the light filtering unit may be controlled to completely transparently transmit the incident light, and control the image sensor to perform photoelectric presentation on the incident light, to obtain a third target image.

It should be noted that, after operation S1904, operation S1901 or S1905 may be performed when it is determined that the gain of the image sensor is equal to the preset value. Operation S1901 or S1905 may be selected based on an actual requirement. This is not limited in this embodiment of this application.

Further, in an embodiment, the photographing apparatus may further include an infrared light compensation unit, or an infrared light compensation unit for light compensation is configured for the photographing apparatus. The photographing method provided in this embodiment of this application may further include: controlling, when the second image exposure interval starts, the infrared light compensation unit to generate infrared light.

Further, as shown in FIG. 20, before operation S1903, the photographing method provided in this embodiment of this application may further include operation S1906.

Operation S1906: Determine whether there is a target object in the first image.

After operation S1906, operation S1903 is performed only when there is the target object in the first image, or operation S1907 is performed when there is no target object in the first image.

Operation S1907: Output the first image as the first target image.

It should be noted that for specific descriptions of the steps in the method provided in this embodiment, refer to specific descriptions of corresponding content in the foregoing apparatus embodiments, and details are not described herein again. In addition, the method provided in this embodiment is used to implement light compensation of the camera in the foregoing embodiment, and therefore can achieve a same effect as that in the foregoing embodiment.

It should be further noted that an execution sequence of the steps in the method provided in this embodiment may be configured based on an actual requirement. FIG. 19 and FIG. 20 are merely examples, and do not constitute a specific limitation.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A photographing apparatus, comprising at least one processor, a control unit, a light filtering unit, an image sensor, and a synthesis processing unit, wherein
    the control unit is connected to the light filtering unit, and is configured by the at least one processor to control the light filtering unit to: transparently transmit visible light in incident light and block infrared light in the incident light in a first image exposure interval, transparently transmit the infrared light in the incident light in a first time period of a second image exposure interval, and block the incident light in a second time period of the second image exposure interval, wherein the first time period is before the second time period;
    the control unit is further connected to the image sensor, and is configured by the at least one processor to control the image sensor to: perform photoelectric imaging on a light ray that is in the incident light and that passes through the light filtering unit in the first image exposure interval, to obtain a first image, and perform photoelectric imaging on a light ray that is in the incident light and that passes through the light filtering unit in the second image exposure interval, to obtain a second image; and
    the synthesis processing unit is configured by the at least one processor to synthesize the first image and the second image, to generate a first target image.

2. The apparatus according to claim 1, wherein the light filtering unit is of a sheet structure, the light filtering unit comprises a first light filter, a second light filter, and a third light filter, the first light filter is configured to transparently transmit the visible light and block the infrared light, the second light filter is configured to transparently transmit the infrared light, and the third light filter is configured to block the incident light; and
    the control unit is configured to control the light filtering unit to rotate, so that the first light filter is configured to filter the incident light in the first image exposure interval, the second light filter is configured to filter the incident light in the first time period, and the third light filter is configured to filter the incident light in the second time period.

3. The apparatus according to claim 2, wherein a shape of the light filtering unit is a circle, a sector, a ring, or a sector ring, and a shape of the first light filter, the second light filter, or the third light filter is a circle or a sector ring; and
    the control unit comprises a motor, wherein the motor is configured to control the light filtering unit to rotate around a circle center corresponding to the light filtering unit, so that the first light filter directly faces a light sensing area of the image sensor in the first image exposure interval, the second light filter directly faces the light sensing area in the first time period, and the third light filter directly faces the light sensing area in the second time period.

4. The apparatus according to claim 3, wherein a sum of a center angle corresponding to the second light filter and a center angle corresponding to the third light filter is $\pi$.

5. The apparatus according to claim 2, wherein a rotational angular velocity of the light filtering unit is $\omega$, a value of $\omega$ is equal to a product of a frame rate of the apparatus and $2\pi$, a center angle corresponding to the first light filter is $\theta=\omega*t_0+\beta$, the center angle corresponding to the second light filter is $\alpha=\omega*t_1+\beta$, $\beta$ is a minimum center angle corresponding to a light sensing area that is in the light filtering unit and that completely covers the image sensor, $t_0$ is duration of the first image exposure interval, and $t_1$ is duration of the first time period.

6. The apparatus according to claim 2, wherein the light filtering unit further comprises a position sensor, configured to feed back position information to the control unit, wherein the position information indicates a relative position between a light filter and the image sensor in the light filtering unit, or the position information indicates a relative position between a preset mark point and the image sensor in the light filtering unit, and the control unit is configured to control, based on the position information, the image sensor to start or end the first image exposure interval or the second image exposure interval.

7. The apparatus according to claim 1, wherein the first image exposure interval and the second image exposure interval are in a same sampling period, and a frame rate of the apparatus is a quantity of sampling periods within each second.

8. The apparatus according to claim 1, wherein the first image exposure interval is before the second image exposure interval.

9. The apparatus according to claim 1, wherein the synthesis processing unit comprises a processing unit and a synthesis unit, and the processing unit is configured by the at least one processor to: correct, based on effective exposure time information of any pixel in the image sensor in the second image exposure interval, a pixel value corresponding to the any pixel in the second image, to obtain a corrected second image; and the synthesis unit is configured by the at least one processor to synthesize the first image and the corrected second image to generate the first target image.

10. A photographing method, comprising:
controlling, by at least one processor, a light filtering unit to: transparently transmit visible light in incident light and block infrared light in the incident light in a first image exposure interval, transparently transmit the infrared light in the incident light in a first time period of a second image exposure interval, and block the incident light in a second time period of the second image exposure interval, wherein the first time period is before the second time period;
performing, by using an image sensor, photoelectric imaging on a light ray that is in the incident light and that passes through the light filtering unit in the first image exposure interval, to obtain a first image, and performing photoelectric imaging on a light ray that is in the incident light and that passes through the light filtering unit in the second image exposure interval, to obtain a second image; and
synthesizing the first image and the second image, to generate a first target image.

11. The method according to claim 10, wherein the light filtering unit is of a sheet structure, the light filtering unit comprises a first light filter, a second light filter, and a third light filter, the first light filter is configured to transparently transmit the visible light and block the infrared light, the second light filter is configured to transparently transmit the infrared light, and the third light filter is configured to block the incident light; and the controlling the light filtering unit to: transparently transmit visible light in incident light and block infrared light in the incident light in a first image exposure interval, transparently transmit the infrared light in the incident light in a first time period of a second image exposure interval, and block the incident light in a second time period of the second image exposure interval comprises:
controlling the light filtering unit to rotate, so that the first light filter is configured to filter the incident light in the first image exposure interval, the second light filter is configured to filter the incident light in the first time period, and the third light filter is configured to filter the incident light in the second time period.

12. The method according to claim 11, wherein a shape of the light filtering unit is a circle, a sector, a ring, or a sector ring, and a shape of the first light filter, the second light filter, or the third light filter is a circle or a sector ring; and the controlling the light filtering unit to rotate, so that the first light filter is configured to filter the incident light in the first image exposure interval, the second light filter is configured to filter the incident light in the first time period, and the third light filter is configured to filter the incident light in the second time period comprises:
controlling the light filtering unit to rotate around a circle center corresponding to the light filtering unit, so that the first light filter directly faces a light sensing area of the image sensor in the first image exposure interval, the second light filter directly faces the light sensing area in the first time period, and the third light filter directly faces the light sensing area in the second time period.

13. The method according to claim 12, wherein a sum of a center angle corresponding to the second light filter and a center angle corresponding to the third light filter is T.

14. The method according to claim 11, wherein a rotational angular velocity of the light filtering unit is $\omega$, a value of $\omega$ is equal to a product of a frame rate corresponding to the first target image and $2\pi$, a center angle corresponding to the first light filter is $\theta=\omega*t_0+\beta$, the center angle corresponding to the second light filter is $\alpha=\omega*t_1+\beta$, $\beta$ is a minimum center angle corresponding to a light sensing area that is in the light filtering unit and that completely covers the image sensor, $t_0$ is duration of the first image exposure interval, and $t_1$ is duration of the first time period.

15. The method according claim 11, further comprising:
obtaining position information by using a position sensor, wherein the position information indicates a relative position between a light filter and the image sensor in the light filtering unit, or the position information indicates a relative position between a preset mark point and the image sensor in the light filtering unit; and
controlling, based on the position information, the image sensor to start or end the first image exposure interval or the second image exposure interval.

16. The method according to claim 10, wherein the first image exposure interval and the second image exposure interval are in a same sampling period, and a quantity of sampling periods within each second is a frame rate corresponding to the first target image.

17. The method according to claim 10, wherein the first image exposure interval is before the second image exposure interval.

18. The method according to claim 10, wherein the synthesizing the first image and the second image, to generate a first target image comprises:
correcting, based on effective exposure time information of any pixel in the image sensor in the second image exposure interval, a pixel value corresponding to the any pixel in the second image, to obtain a corrected second image; and
synthesizing the first image and the corrected second image to generate the first target image.

19. The method according to claim 10, wherein the first image is a color image, the second image is a grayscale image, and the first target image is a color image.

20. A non-transitory computer-readable storage medium, comprising computer software instructions, wherein
when the computer software instructions are executed by at least one processor of a computing device, the computing device is enabled to perform operations of:
controlling a light filtering unit to: transparently transmit visible light in incident light and block infrared light in the incident light in a first image exposure interval, transparently transmit the infrared light in the incident light in a first time period of a second image exposure interval, and block the incident light in a second time period of the second image exposure interval, wherein the first time period is before the second time period;
performing, by using an image sensor, photoelectric imaging on a light ray that is in the incident light and that passes through the light filtering unit in the first image exposure interval, to obtain a first image, and performing photoelectric imaging on a light ray that is in the incident light and that passes through the light filtering unit in the second image exposure interval, to obtain a second image; and synthesizing the first image and the second image, to generate a first target image.

\* \* \* \* \*

UNITED STATES PATENT AND TRADEMARK OFFICE
CERTIFICATE OF CORRECTION

PATENT NO. : 12,108,161 B2
APPLICATION NO. : 17/965083
DATED : October 1, 2024
INVENTOR(S) : Xiaolei Chen et al.

Page 1 of 1

It is certified that error appears in the above-identified patent and that said Letters Patent is hereby corrected as shown below:

In the Claims

In Claim 13, Column 38, Line 3, delete "T" and insert --$\pi$--.

Signed and Sealed this
Twenty-first Day of January, 2025

Coke Morgan Stewart
*Acting Director of the United States Patent and Trademark Office*